US012447999B2

(12) United States Patent
Aizawa et al.

(10) Patent No.: US 12,447,999 B2
(45) Date of Patent: Oct. 21, 2025

(54) MOVING OBJECT CONTROL SYSTEM, MOVING OBJECT, CONTROL METHOD, AND STORAGE MEDIUM

(71) Applicant: HONDA MOTOR CO., LTD., Tokyo (JP)

(72) Inventors: Koki Aizawa, Wako (JP); Misako Yoshimura, Wako (JP); Ichiro Baba, Wako (JP); Kosuke Nakanishi, Wako (JP); Yosuke Koike, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/672,765

(22) Filed: Feb. 16, 2022

(65) Prior Publication Data
US 2022/0266861 A1 Aug. 25, 2022

(30) Foreign Application Priority Data

Feb. 24, 2021 (JP) .................. 2021-027538

(51) Int. Cl.
*B60W 60/00* (2020.01)
*B60W 40/04* (2006.01)
(52) U.S. Cl.
CPC ........ *B60W 60/0011* (2020.02); *B60W 40/04* (2013.01); *B60W 60/00253* (2020.02); *B60W 2554/406* (2020.02)
(58) Field of Classification Search
CPC ............. B60W 60/0011; B60W 40/04; B60W 60/00253; B60W 2554/406; B60W 30/0956; B60W 60/0015; B60W 60/001
See application file for complete search history.

(56) References Cited

U.S. PATENT DOCUMENTS 10,222,798 B1\* 3/2019 Brady .................. G05D 1/0297
10,836,392 B2\* 11/2020 Tokuhiro ............. G05D 1/0246
(Continued)

FOREIGN PATENT DOCUMENTS

| JP | 2003-288663 | 10/2003 |
| JP | 2004-108937 | 4/2004 |

(Continued)

OTHER PUBLICATIONS

Japanese Notice Of Allowance for Japanese Patent Application No. 2021-027538 mailed Jun. 18, 2024.
(Continued)

*Primary Examiner* — Dale W Hilgendorf
*Assistant Examiner* — Frank T Glenn, III
(74) *Attorney, Agent, or Firm* — Amin, Turocy & Watson, LLP

(57) ABSTRACT

A moving object control system includes a storage device configured to store instructions; and one or more processors, wherein the one or more processors executes the instructions stored in the storage device to determine a stop position of a moving object in a sidewalk region near a specific location in a case where a degree of congestion of a sidewalk near the specific location is less than a threshold value, and determines the stop position in a region that does not belong to the sidewalk region near the specific location in a case where the degree of congestion of the sidewalk near the specific location is equal to or more than the threshold value.

20 Claims, 16 Drawing Sheets

(56) References Cited

U.S. PATENT DOCUMENTS

| | | | |
|---|---|---|---|
| 2016/0232785 A1* | 8/2016 | Wang | G08G 1/0129 |
| 2018/0202822 A1* | 7/2018 | DeLizio | G06Q 30/0645 |
| 2019/0049968 A1* | 2/2019 | Dean | G05D 1/0255 |
| 2019/0061764 A1 | 2/2019 | Tokuhiro et al. | |
| 2019/0108753 A1* | 4/2019 | Kaiser | G08G 1/0141 |
| 2019/0161080 A1* | 5/2019 | Gochev | G08G 1/165 |
| 2020/0175869 A1* | 6/2020 | Khoo | G08G 1/0112 |
| 2020/0242921 A1* | 7/2020 | Busch | G08G 1/166 |
| 2020/0324793 A1 | 10/2020 | Otaki et al. | |
| 2022/0005358 A1* | 1/2022 | Haghighat Kashani | B60W 60/0011 |

FOREIGN PATENT DOCUMENTS

| | | | |
|---|---|---|---|
| JP | 2017-182206 | 10/2017 | |
| JP | 2018-173985 | 11/2018 | |
| JP | 2020-165786 | 10/2020 | |
| JP | 2020-173569 | 10/2020 | |
| WO | WO-2017210904 A1 * | 12/2017 | G01C 21/34 |

OTHER PUBLICATIONS

Chinese Office Action for Chinese Patent Application No. 202210148621.9 mailed May 30, 2025.

* cited by examiner

FIG. 9

○ DEGREE OF CONGESTION IS LESS THAN THRESHOLD VALUE
× DEGREE OF CONGESTION IS EQUAL TO OR MORE THAN THRESHOLD VALUE

| NUMBER | SIDEWALK | ROADWAY | ENTRANCE OF SIDEWALK ON ROADWAY | PRIORITY |
|---|---|---|---|---|
| (1) | ○ | ○ | ○ | SIDEWALK > ROADWAY > ENTRANCE OF SIDEWALK |
| (2) | ○ | × | ○ | SIDEWALK > ENTRANCE OF SIDEWALK |
| (3) | × | ○ | ○ | ENTRANCE OF SIDEWALK > ROADWAY |
| (4) | × | ○ | × | ROADWAY |
| (5) | × | × | ○ | ENTRANCE OF SIDEWALK |

FIG. 10

| SPECIFIC LOCATION | CONDITIONS FOR NOT STOPPING ON SIDEWALK |
|---|---|
| A | ○:00 TO △:00 ON MONDAY TO FRIDAY |
| B | △:00 TO ×:00 ON MONDAY TO FRIDAY |
| C | WEATHER IS FINE |
| D | USER HAS PREDETERMINED ATTRIBUTE |
| ⋮ | ⋮ |

FIG. 11

| SPECIFIC LOCATION | CONDITIONS FOR NOT STOPPING ON SIDEWALK | USER'S ATTRIBUTE |
|---|---|---|
| A | ○:00 TO △:00 ON MONDAY TO FRIDAY | USER'S ATTRIBUTE A |
| B | △:00 TO ×:00 ON MONDAY TO FRIDAY | USER'S ATTRIBUTE B |
| C | WEATHER IS FINE | ALL USERS |
| ⋮ | ⋮ | ⋮ |

FIG. 14

| LOCATION \ ELEMENT | OTHER ELEMENTS | | | DEGREE OF CONGESTION | |
|---|---|---|---|---|---|
| | TIME | DAY OF WEEK | WEATHER | DEGREE OF CONGESTION OF SIDEWALK | DEGREE OF CONGESTION OF ROADWAY |
| CRAM SCHOOL/SCHOOL | 1 | 1 | 3 | 2 | 4 |
| STATION | 2 | 1 | 4 | 3 | 5 |
| HOME | ... | ... | 3 | 1 | 2 |
| ... | ... | ... | ... | ... | ... |

| LOCATION \ ELEMENT | TIME | DAY OF WEEK | WEATHER | DEGREE OF CONGESTION OF SIDEWALK | DEGREE OF CONGESTION OF ROADWAY |
|---|---|---|---|---|---|
| CRAM SCHOOL/SCHOOL | OTHER THAN 8:00 TO 21:00 | SATURDAY, SUNDAY | FINE | DEGREE OF CONGESTION LEVEL 1 | DEGREE OF CONGESTION LEVEL 2 |
| STATION | OTHER THAN 7:30 TO 9:00 OTHER THAN 17:00 TO 20:00 | MONDAY TO FRIDAY | FINE | DEGREE OF CONGESTION LEVEL 1 | DEGREE OF CONGESTION LEVEL 2 |
| HOME | ... | ... | ... | DEGREE OF CONGESTION LEVEL 1 | DEGREE OF CONGESTION LEVEL 1 |
| ... | ... | ... | ... | ... | ... |

FIG. 15

| ELEMENT LOCATION | USER'S ATTRIBUTE | OTHER ELEMENTS | | | DEGREE OF CONGESTION | |
|---|---|---|---|---|---|---|
| | | TIME | DAY OF WEEK | WEATHER | DEGREE OF CONGESTION OF SIDEWALK | DEGREE OF CONGESTION OF ROADWAY |
| CRAM SCHOOL/SCHOOL | 1 | 2 | 2 | 4 | 3 | 5 |
| STATION | 1 | | | | | |
| HOME | ... | ... | ... | 3 | 1 | 2 |
| ... | ... | | | ... | ... | ... |

| ELEMENT LOCATION | USER'S ATTRIBUTE | OTHER ELEMENTS | | | DEGREE OF CONGESTION | |
|---|---|---|---|---|---|---|
| | | TIME | DAY OF WEEK | WEATHER | DEGREE OF CONGESTION OF SIDEWALK | DEGREE OF CONGESTION OF ROADWAY |
| CRAM SCHOOL/SCHOOL | CHILD | OTHER THAN 8:00 TO 21:00 | SATURDAY, SUNDAY | FINE | DEGREE OF CONGESTION LEVEL 1 | DEGREE OF CONGESTION LEVEL 2 |
| STATION | PERSON WITH DISABILITY | | | | DEGREE OF CONGESTION LEVEL 1 | DEGREE OF CONGESTION LEVEL 1 |
| HOME | ... | ... | ... | ... | ... | ... |
| ... | | | | | | |

FIG. 16

| ELEMENT | ELEMENT | TIME | DAY OF WEEK | WEATHER | DEGREE OF CONGESTION OF SIDEWALK | DEGREE OF CONGESTION OF ROADWAY |
|---|---|---|---|---|---|---|
| | LOCATION | | | | | |
| CHILD | CRAM SCHOOL/SCHOOL | 1 | 1 | 3 | 2 | 4 |
| | STATION | 2 | 1 | 4 | 3 | 5 |
| | HOME | ... | ... | 3 | 1 | 2 |
| ... | | | | ... | ... | ... |

FOR EACH ATTRIBUTE

MOVING OBJECT CONTROL SYSTEM, MOVING OBJECT, CONTROL METHOD, AND STORAGE MEDIUM

CROSS-REFERENCE TO RELATED APPLICATION

Priority is claimed on Japanese Patent Application No. 2021-027538 filed on Feb. 24, 2021, the content of which is incorporated herein by reference.

BACKGROUND

Field

The present invention relates to a moving object control system, a moving object, a control method, and a storage medium.

Description of Related Art

In the related art, a vehicle state determination device is disclosed which, when it is determined that a density in a scheduled passage region of a moving object present in the scheduled passage region of a vehicle changes from a sparse state in which the density is equal to or less than a predetermined value to a dense state in which the density is more than the predetermined value, determines that an entry notification operation for notifying a moving object that a vehicle is likely to enter the scheduled passage region in a time period in a sparse state is possible and outputs a predetermined control signal (Japanese Unexamined Patent Application, First Publication No. 2017-182206).

SUMMARY

In the above technique, it may not be possible to appropriately determine a stop position of a moving object.

The present invention has been made in consideration of such circumstances, and one object thereof is to provide a moving object control system of a moving object, a moving object, a control method, and a storage medium capable of appropriately determining a stop position of the moving object.

The moving object control system, the moving object, the control method, and the storage medium according to the present invention have the following configurations.

(1): According to an aspect of the present invention, a moving object control system is provided including a storage device configured to store instructions; and one or more processors, wherein the one or more processors executes the instructions stored in the storage device to determine a stop position of a moving object in a sidewalk region near a specific location in a case where a degree of congestion of a sidewalk near the specific location is less than a threshold value, and determines the stop position in a region that does not belong to the sidewalk region near the specific location in a case where the degree of congestion of the sidewalk near the specific location is equal to or more than the threshold value.

(2): In the aspect of the above (1), the degree of congestion is a degree to which objects are present on the sidewalk.

(3): In the aspect of the above (1) or (2), the region that does not belong to the sidewalk region includes a roadway near the specific location or a sidewalk region other than the sidewalk region near the specific location.

(4): In any one of the aspects of the above (1) to (3), the one or more processors further executes the instructions to: even if the degree of congestion of the sidewalk near the specific location is less than the threshold value, in a case where an element different from the degree of congestion satisfies a predetermined condition, determine the stop position in the region that does not belong to the sidewalk region.

(5): In the aspect of the above (4), the element different from the degree of congestion is a static element that does not change dynamically in the vicinity of the sidewalk, unlike the degree of congestion that changes dynamically in the vicinity of the sidewalk.

(6): In the aspect of the above (5), the static element includes one or more elements of a day of the week, a time period, or weather.

(7): In the aspect of the above (5) or (6), details of the static element are correlated with the specific location according to characteristics of the specific location.

(8): In any one of the aspects of the above (4) to (7), the predetermined condition includes whether or not an attribute of a user of the moving object is a predetermined attribute.

(9): In any one of the aspects of the above (4) to (8), the predetermined condition includes whether the specific location is a waypoint or a destination.

(10): In any one of the aspects of the above (1) to (9), the one or more processors further executes the instructions to: even if the degree of congestion of the sidewalk near the specific location is less than the threshold value, in a case where there is a region where the moving object can stop managed by the specific location or a region where the moving object can stop affiliated with the specific location, determine the stop position in the region where the moving object can stop.

(11): In any one of the aspects of the above (1) to (10), the one or more processors further executes the instructions to: in a case where the stop position of the moving object is determined in the sidewalk region near the specific location, determine a position that does not interfere with an object moving on the sidewalk as a stop position.

(12): According to another aspect of the present invention, a moving object is provided equipped with the moving object control system according to any one of the aspects of the above (1) to (11).

(13): The moving object according to the aspect of the above (12) controls the own device such that the own device stops at the stop position determined by the one or more processor.

(14): According to still another aspect of the present invention, a control method comprising, by a computer: determining a stop position of a moving object in a sidewalk region near a specific location in a case where a degree of congestion of a sidewalk near the specific location is less than a threshold value; and determining the stop position in a region that does not belong to the sidewalk region near the specific location in a case where the degree of congestion of the sidewalk near the specific location is equal to or more than the threshold value.

(15): According to still another aspect of the present invention, a non-transitory computer storage medium is provided storing a program causing a computer to execute determining a stop position of a moving object in a sidewalk region near the specific location in a case where a degree of congestion of a sidewalk near the specific location is less than a threshold value; and determining the stop position in another region that does not belong to the sidewalk region near the specific location in a case where the degree of congestion of the sidewalk near the specific location is equal to or more than the threshold value.

According to (1) to (15), the moving object control system can appropriately determine a stop position of the moving object according to the degree of congestion of the sidewalk near the specific location.

According to (4), the moving object control system can more appropriately determine a stop position of the moving object by taking into consideration an element different from the degree of congestion.

According to (7), the moving object control system can set a position suitable for the characteristics of the specific location as a stop position.

According to (10), the moving object control system determines a stop position in a region where the moving object can stop in a case where there is a region where the moving object can stop managed by the specific location or affiliated with the specific location and can thus set a position with high convenience as a stop position and give consideration to the surroundings when using the specific location.

According to (11), the moving object control system can set a position in consideration of an object moving on the sidewalk as a stop position.

BRIEF DESCRIPTION OF THE DRAWINGS

FIG. 9 is a diagram showing an example of a relationship between the degree of congestion of a predetermined region (sidewalk) of a sidewalk, the degree of congestion of a predetermined region (roadway) of a roadway, and the degree of congestion of an entrance of the sidewalk (entrance of the sidewalk) on the roadway, and a preferential stop position.

FIG. 10 is a diagram showing an example of condition information in which a specific location and a condition that a moving object does not stop on a sidewalk are correlated with each other.

FIG. 11 is a diagram showing another example of condition information in which the specific location and the condition that the moving object does not stop on the sidewalk are correlated with each other.

FIG. 14 is a diagram showing an example of details of priority information.

FIG. 15 is a diagram showing another example of details of the priority information.

FIG. 16 is a diagram showing still another example of details of the priority information.

DETAILED DESCRIPTION

Hereinafter, a moving object control system, a moving object, a control method, and a storage medium according to embodiments of the present invention will be described with reference to the drawings.

First Embodiment

Overall Configuration

Figure 1:
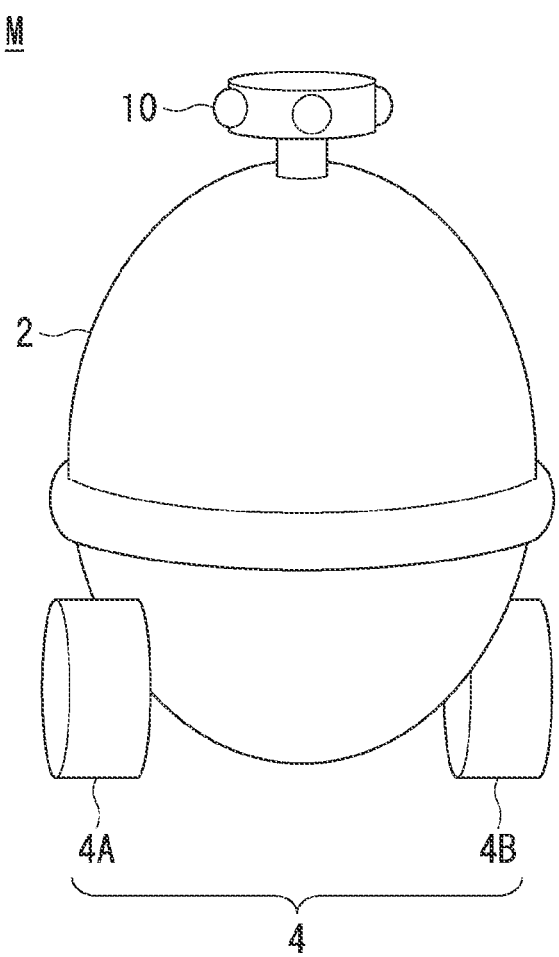
FIG. 1 is a diagram showing an example of a moving object including a control device according to an embodiment.

FIG. 1 is a diagram showing an example of a moving object M including a control device according to an embodiment. The moving object M is an autonomous mobile robot. The moving object M supports a user's action. For example, the moving object M stops at a position designated by the user, carries the user, and transports the user to a destination. In the present embodiment, the moving object M is described as carrying the user and moving, but instead (or in addition), the moving object M may support the user's action by transporting an article, moving together with the user while leading the user, or following the user. The moving object M may be one that a user can ride or one that a user cannot ride.

The moving object M includes a main body 2, one or more wheels 4 (4A and 4B in FIG. 1), and a camera 10. The main body 2 is provided with an entrance such as a door (not shown) that allows a user to enter and exit the main body 2, and the user can enter the main body 2 from the entrance and get on the moving object M. For example, the moving object M drives the wheels 4 on the basis of an image captured by the camera 10 to transport the user.

In the present embodiment, the user is described as riding the main body 2, but instead (or in addition), the moving object M may be provided with, for example, a seating portion on which the user can be seated without riding the main body 2 in order for the user to move with the moving object M or a step on which the user puts his/her foot for movement (for example, the moving object may be scooter).

Figure 2:
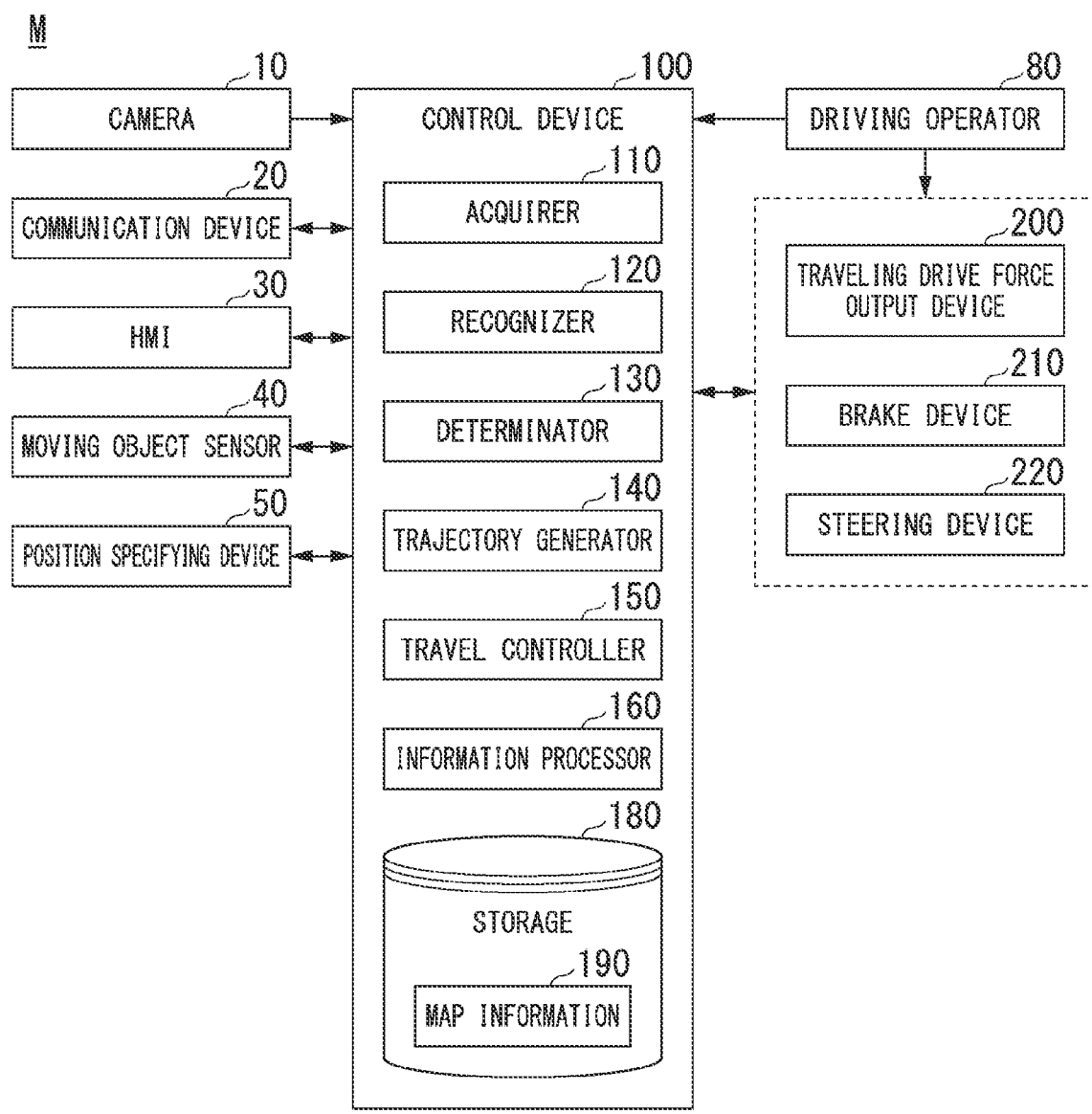
FIG. 2 is a diagram showing an example of another functional configuration included in the moving object.

FIG. 2 is a diagram showing an example of another functional configuration included in the moving object M. The moving object M includes, for example, the camera 10, a communication device 20, an HMI 30, a moving object sensor 40, a position specifying device 50, a driving operator 80, a control device 100, a traveling drive force output device 200, a brake device 210, and a steering device 220.

The camera 10 images the periphery of the moving object M. The camera 10 is, for example, a fisheye camera capable of imaging the periphery of the moving object M at a wide angle (for example, at 360 degrees). The camera 10 is attached to, for example, an upper part of the moving object M and images the periphery of the moving object M at a wide angle in a horizontal direction. The camera 10 may be implemented by combining a plurality of cameras (a plurality of cameras that capture images in a range of 120 degrees or a range of 60 degrees with respect to the horizontal direction). In addition to the camera 10, the moving object M may include a radar device or LIDAR that detects an object.

The communication device 20 is a communication interface for communicating with other devices by using a cellular network, a Wi-Fi network, Bluetooth (registered trademark), dedicated short range communication (DSRC), or the like.

The HMI 30 presents various types of information to a user of the moving object M and receives an input operation by the user. The HMI 30 includes various display devices, speakers, buzzers, touch panels, switches, keys, and the like.

The moving object sensor 40 includes a vehicle speed sensor that detects a speed of the moving object M, an acceleration sensor that detects an acceleration, a yaw rate sensor that detects an angular velocity around a vertical axis, an azimuth sensor that detects an orientation of the moving object M, and the like.

The position specifying device 50 specifies a position of the moving object M on the basis of a signal received from a GNSS satellite. The position of the moving object M may be specified or complemented by an inertial navigation system (INS) using an output of the moving object sensor 40.

The driving operator 80 includes, for example, an accelerator pedal, a brake pedal, a shift lever, a steering wheel, a deformed steering wheel, a joystick, and other operators. A sensor that detects an amount of operation or the presence or absence of operation is attached to the driving operator 80, and a detection result is output to some or all of the control device 100, the traveling drive force output device 200, the brake device 210, and the steering device 220. In a case where the moving object M is controlled only through automated driving, the driving operator 80 may be omitted.

The control device 100 includes, for example, an acquirer 110, a recognizer 120, a determinator 130, a trajectory generator 140, a travel controller 150, an information processor 160, and a storage 180. Each of the acquirer 110, the recognizer 120, the determinator 130, the trajectory generator 140, the travel controller 150, and the information processor 160 is realized, for example, by a hardware processor such as a central processing unit (CPU) executing a program (software). Some or all of the constituents may be realized by hardware (a circuit portion; including circuitry) such as a large scale integration (LSI), an application specific integrated circuit (ASIC), a field-programmable gate array (FPGA), or a graphics processing unit (GPU), and may be realized by software and hardware in cooperation. The program may be stored in the storage 180 (a storage device provided with a non-transitory storage medium) such as an HDD or a flash memory, and may be stored in an attachable and detachable storage medium (non-transitory storage medium) such as a DVD or a CD-ROM and may be installed in the HDD or the flash memory when the storage medium is attached to a drive device. Some of the above functional units may be included in other devices. For example, the recognizer 120 may be included in another device and recognize a status of a roadway or a sidewalk by analyzing an image captured by a camera that is provided on the roadway or sidewalk and images the roadway or sidewalk. In this case, the control device 100 may acquire information indicating the status of the roadway or the sidewalk from the other device, and execute various processes on the basis of the acquired status. In this case, a configuration in which the recognizer of the other device and the functional configuration included in the control device 100 are combined is an example of a "moving object control system".

The acquirer 110 acquires an image captured by the camera 10. The acquirer 110 acquires an image of a road surface around the moving object M.

The recognizer 120 recognizes an object or a situation near the moving object M by using, for example, a function of artificial intelligence (AI) or a function of a model provided in advance, or by using these in parallel. For example, a function of "recognizing a region where the moving object M can travel" may be realized by executing recognition of roads, sidewalks, curbs, and the like through deep learning and recognition based on conditions (a signal that can be matched with a pattern) provided in advance in parallel and scoring and comprehensively evaluating both of recognition results. The recognizer 120 may execute a semantic segmentation process to classify each pixel in a frame of an image into classes (for example, an object, a region where a vehicle can travel, and a region where a vehicle cannot travel), and may recognize a region where the moving object M can travel on the basis of a classification result. Consequently, the reliability of movement of the moving object M is ensured.

The recognizer 120 recognizes states of an object, such as a position, a speed, and an acceleration of an object near the moving object M on the basis of an image captured by the camera 10. The position of the object is recognized as, for example, a position in absolute coordinates with a representative point (the centroid, the center of drive axis, or the like) of the moving object M as the origin and is used for control. The position of the object may be represented by a representative point such as the centroid or a corner of the object, or may be represented by an expressed region. The "states" of the object may include the object's acceleration, jerk, or "action state" (for example, whether the object is changing lanes or about to change lanes). The recognizer 120 recognizes, for example, road lane markings, shoulders, curbs, medians, guardrails, stop lines, obstacles, traffic lights, and other road events. The recognizer 120 recognizes a position or a posture of the moving object M. The recognizer 120 uses the position of the object obtained from the image to derive the degree of congestion of a predetermined region (details thereof will be described later). The degree of congestion of a predetermined region may be obtained from other devices. In this case, the communication device 20 acquires information indicating the degree of congestion from other devices.

The determinator 130 determines a position where the moving object M stops. For example, when the moving object M stops, the determinator 130 determines whether to cause the moving object M to stop on a sidewalk or on a roadway. Details of the process of the determinator 130 will be described later.

The trajectory generator 140 determines one or both of a stop position where the moving object M stops and a travel position where the moving object M travels on the basis of a user's instruction, the region where the moving object M can travel, and the region where the moving object M cannot travel.

The trajectory generator 140 generates a target trajectory on which the moving object M will travel in an automated manner (regardless of a driver's operation) in the future such that the moving object M can cope with a peripheral situation of the moving object M. The target trajectory includes, for example, a speed element. For example, the target trajectory is expressed by sequentially arranging locations (trajectory points) to be reached by the moving object M in order. The trajectory points are locations to be reached by the moving object M every predetermined traveling distance (for example, about several [m]) in terms of a distance along a road, and, separately, a target speed and a target acceleration for each predetermined sampling time (for example, any of about 0.1 to 0.9 seconds) are generated as parts of the target trajectory. A trajectory point may be a position to be reached by the moving object M at a sampling time point every predetermined sampling time. In this case, information regarding the target speed or the target acceleration may be expressed by an interval between trajectory points.

The trajectory generator 140 generates a trajectory on which the moving object M moves and calculates a risk of the generated trajectory. The risk is an index value indicating a high possibility that the moving object M may approach an obstacle. The risk tends to become higher as a distance from an obstacle to the trajectory (trajectory point) becomes shorter, and lower as the distance from the obstacle to the trajectory (trajectory point) becomes longer.

In a case where a total value of the risks or the risk of each trajectory point satisfies a preset criterion (for example, the total value is a threshold value Th1 or less and the risk of each trajectory point is a threshold value Th2 or less), the trajectory generator 140 employs a trajectory satisfying the criterion as a trajectory on which the moving object moves.

The travel controller 150 causes the moving object M to travel along the trajectory satisfying the preset criterion. The travel controller 150 outputs a command value for the moving object M to travel along the trajectory to the traveling drive force output device 200.

The information processor 160 controls various devices or apparatuses included in the moving object M. The information processor 160 controls, for example, the HMI 30. The information processor 160 acquires voice data input to a microphone and recognizes an operation performed on an operator.

The traveling drive force output device 200 outputs a traveling drive force (torque) for the moving object M to travel to the drive wheels. The traveling drive force output device 200 includes, for example, an electric motor and an electronic control unit (ECU) that controls the electric motor. The ECU controls the above configuration according to information input from the travel controller 150 or information input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information input from the travel controller 150 or information input from the driving operator 80, so that brake torque corresponding to a braking operation is output to each vehicle wheel.

The steering device 220 includes, for example, a steering ECU and an electric motor. The electric motor changes an orientation of a turning wheel by applying force to, for example, a rack-and-pinion mechanism. The steering ECU drives the electric motor on the basis of information input from the travel controller 150 or information input from the driving operator 80, so that an orientation of the turning wheel is changed.

Outline of Moving Object Control

Figure 3:
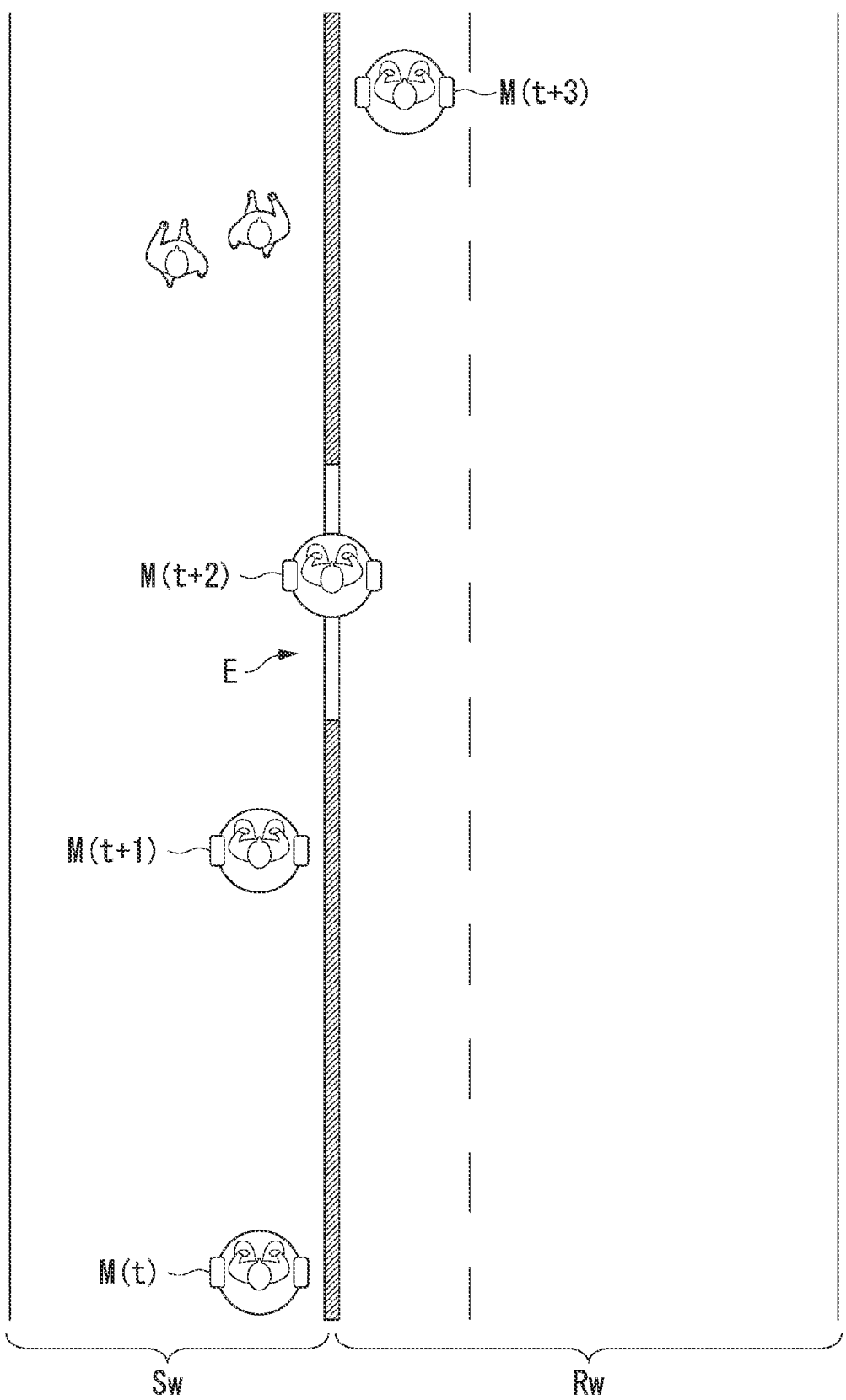
FIG. 3 is a diagram showing an example of an action of the moving object.

FIG. 3 is a diagram showing an example of an action of the moving object M. The moving object M, for example, carries a user and heads for a destination. In this case, the moving object M travels on a sidewalk Sw (time points t and t+1) or descends from the sidewalk Sw to a roadway Rw and travels on the roadway Rw (time point t+2 and time point t+3). The moving object M, for example, travels on the sidewalk Sw at a speed as high as a walking speed of a pedestrian (for example, 4 km/h or 6 km/h) and walks on the roadway Rw at a speed higher than the above-described walking speed, for example. In FIG. 3, "E" indicates an entrance of the roadway (a region where it is possible to enter the sidewalk from the roadway (or the roadway from the sidewalk)).

Outline of Process When Determining Stop Position

The determinator 130 of the control device 100 determines a stop position of the moving object M corresponding to a specific location (the stop position where the specific location is easily accessible or the stop position near an entrance of the specific location). In a case where the degree of congestion of the sidewalk near the specific location (for example, in front of the entrance of the specific location) is less than a threshold value, the determinator 130 determines a stop position in a sidewalk region near the specific location, and in a case where the degree of congestion of the sidewalk near the specific location is equal to or more than the threshold value, determines the stop position in another region that does not belong to the sidewalk region near the specific location. The determinator 130 performs the above process, for example, when a first user who has ridden the moving object M gets off at the specific location, or a second user who is scheduled to ride the moving object M gets on at the specific location. The trajectory generator 140 generates a trajectory on which the moving object M stops at the position determined by the determinator 130. The travel controller 150 causes the moving object M to travel on the basis of the trajectory generated by the trajectory generator 140 and the moving object M to stop at the position determined by the determinator 130. The determinator 130 or a functional unit in which one or both of the determinator 130 and the trajectory generator 140 or the travel controller 150 are combined is an example of a "controller".

The specific location may be a destination of a user riding the moving object M, or may be a waypoint. The specific location is, for example, a position designated by a user. The specific location may be such a position or a position designated by a user to ride the moving object M.

The degree of congestion is an index based on the number of objects and people in a predetermined region near the specific location. An object may be a stationary object (for example, a signboard, a utility pole, a roadside tree, or the like) or a movable object (a parked bicycle, a trolley, or a temporarily placed luggage), or may be a movable object without including a stationary object. For example, it can be said that the degree of congestion becomes higher as an area occupied by objects on a road surface in a predetermined region becomes larger. The degree of congestion may be, for example, a density. The density is the degree to which objects are distributed over an area of a road surface. The degree of congestion may be, for example, the number of objects on a road surface.

The above "in another region that does not belong to the sidewalk region" is, for example, a roadway near the specific location or a sidewalk region other than the sidewalk region near the specific location. The sidewalk region other than the sidewalk region near the specific location is a sidewalk region over a predetermined distance before the specific location, a sidewalk region at a predetermined distance, or the like, and is a region where a user who gets off the moving object M can reach the specific location on foot from several tens of seconds to a few minutes, or a region where a user who will ride the moving object M can reach the moving object M on foot from the specific location from several tens of seconds to a few minutes.

Process When Determining Stop Position (First)

Figure 4:
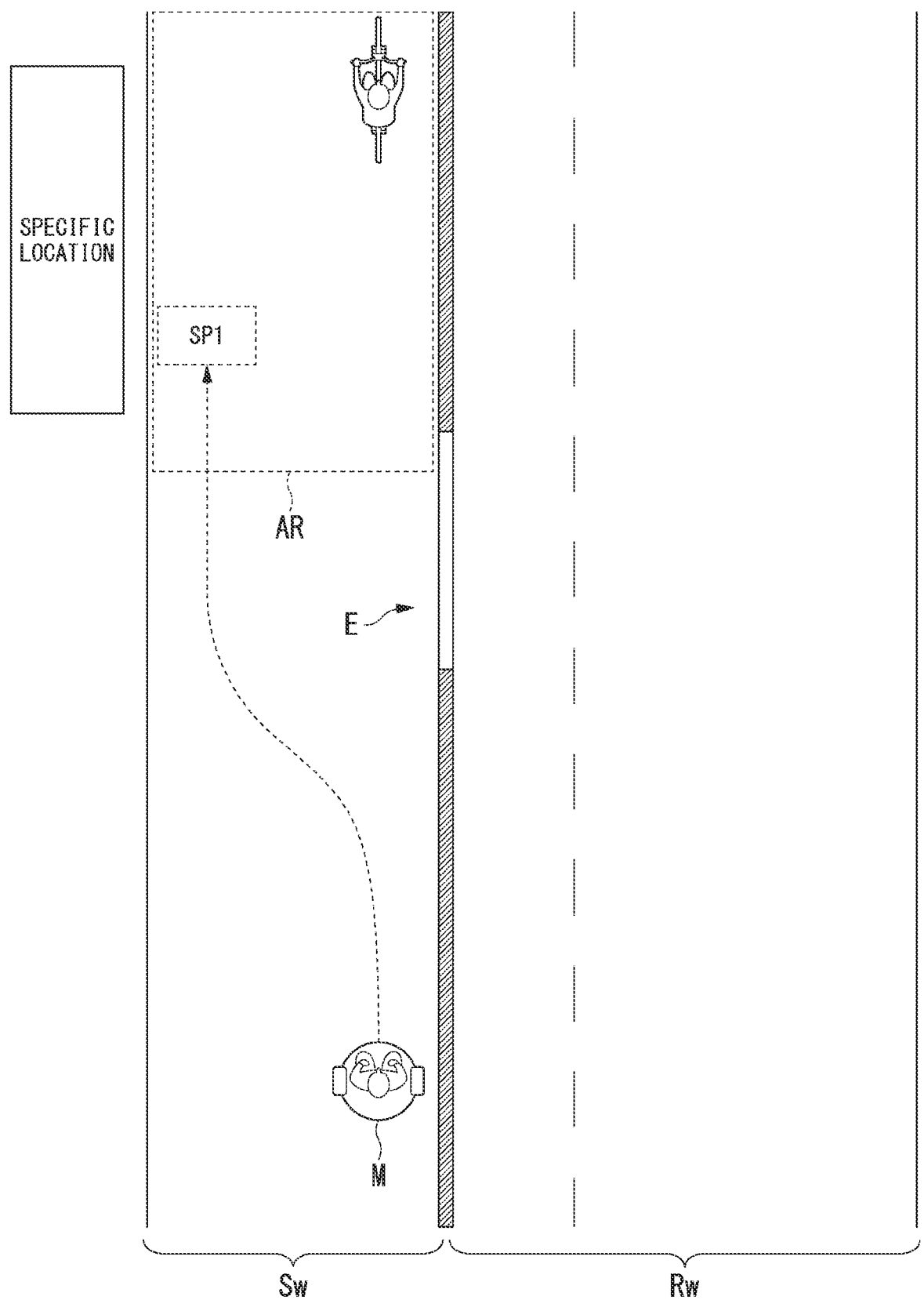
FIG. 4 is a diagram showing an example of a stop position of the moving object in a case where the degree of congestion of a predetermined region is less than a threshold value.

FIG. 4 is a diagram showing an example of a stop position of the moving object M in a case where the degree of congestion of a predetermined region AR is less than a threshold value. The predetermined region AR is an example of a "sidewalk near a specific location". In the example in FIG. 4, the moving object M is located on the sidewalk in front of a specific location by a predetermined distance. In this case, the moving object M (control device 100) recognizes the degree of congestion of the predetermined region AR. As shown in FIG. 4, in a case where the degree of congestion is less than the threshold value, the moving object M determines a position SP1 as a stop position, generates a route toward the position SP1, travels along the route, and stops at the position SP1. A user riding the moving object M may get off at the position SP1 and head for the specific location.

As described above, the moving object M stops on the sidewalk near the specific location, and thus the user can quickly head for the specific location. As described above, the moving object M can determine a more appropriate position as a stop position.

Process When Determining Stop Position (Second)

Figure 5:
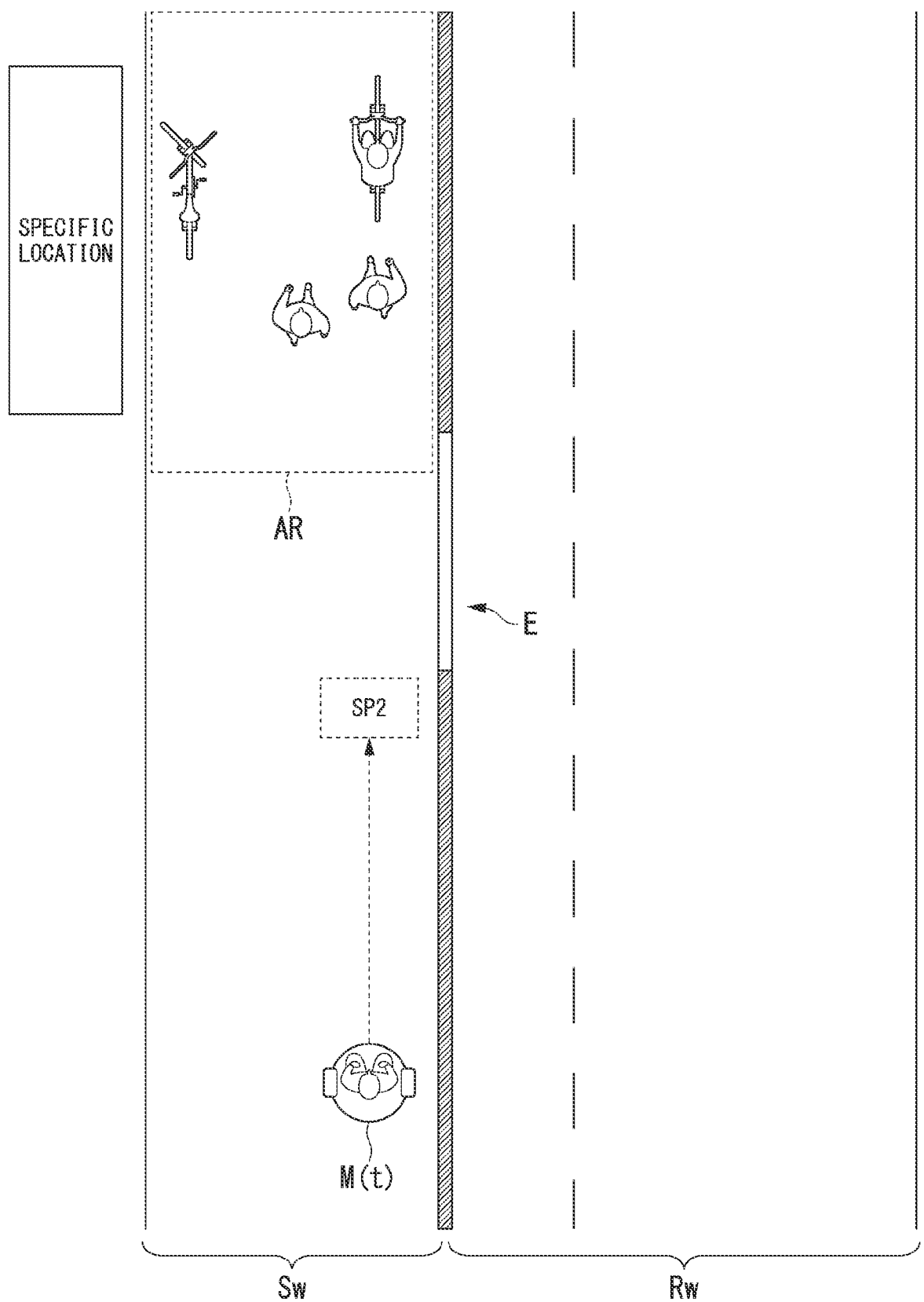
FIG. 5 is a diagram showing an example of a stop position of the moving object in a case where the degree of congestion of the predetermined region is equal to or more than the threshold value.

FIG. 5 is a diagram showing an example of a stop position of the moving object M in a case where the degree of congestion of the predetermined region AR is equal to or more than the threshold value. The description will focus on differences from FIG. 4. As shown in FIG. 5, in a case where the degree of congestion is equal to or more than the threshold value, the moving object M determines a position SP2 as a stop position, generates a route toward the position SP2, travels along the route, and stops at the position SP2. The position SP2 is, for example, a position in front of the specific location and in front of the entrance E of the sidewalk (in a longitudinal direction of the sidewalk). A user riding the moving object M may get off at the position SP2 and head for the specific location.

As described above, since the moving object M allows the user to get off in front of the crowded predetermined region AR and near the specific location, control can be realized in consideration of a peripheral situation and the convenience of the user. Since the moving object M stops before the entrance E of the sidewalk, it is possible to prevent the course of a bicycle or other moving objects entering the sidewalk from the roadway from being obstructed. As described above, the moving object M can determine a more appropriate position as the stop position.

Process When Determining Stop Position (Third)

Figure 6:
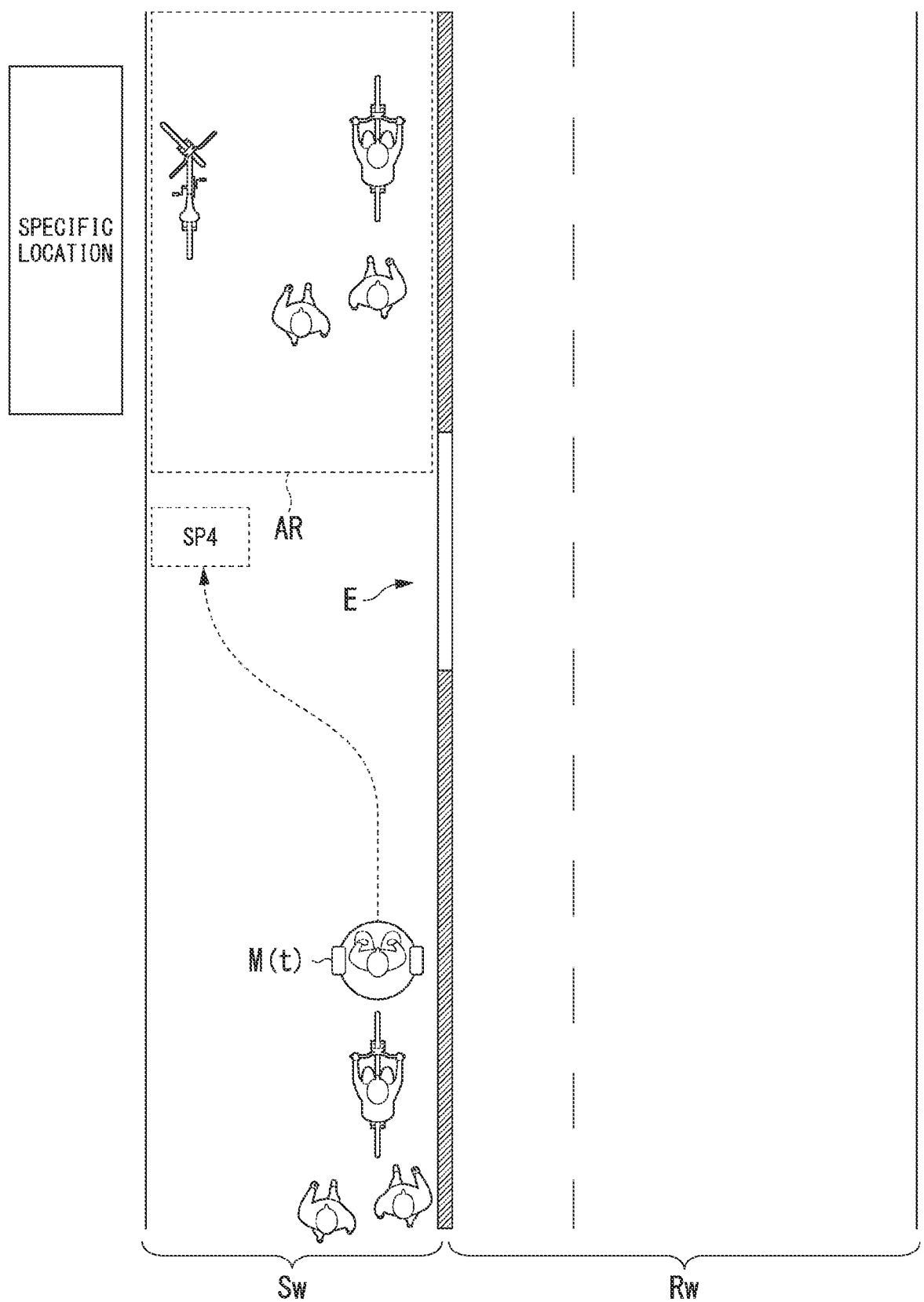
FIG. 6 is a diagram showing another example of a stop position of the moving object in a case where the degree of congestion of the predetermined region is equal to or more than the threshold value.

FIG. 6 is a diagram showing another example of a stop position of the moving object M in a case where the degree of congestion of the predetermined region AR is equal to or more than the threshold value. The description will focus on differences from FIG. 5. As shown in FIG. 6, in a case where the degree of congestion is equal to or more than the threshold value and there is a moving object (rear object) such as a pedestrian or a bicycle traveling straight on the sidewalk behind the moving object M, the moving object M determines a position SP4 that does not obstruct the course of the rear object as a stop position. That is, in a case where the control device 100 determines the stop position of the moving object M in a sidewalk region near the specific location, the control device 100 determines a position that does not interfere with an object moving on the sidewalk as a stop position. The position SP4 is in front of the predetermined region AR and is a position predicted not to interfere with a trajectory on which a rear object is predicted to travel in the future.

As described above, the moving object M can realize control in consideration of a peripheral situation and the convenience of a user by avoiding a congested region and considering a rear object. For example, the moving object M can contribute to smooth sidewalk traffic. As described above, the moving object M can determine a more appropriate position as a stop position.

Process When Determining Stop Position (Fourth)

Figure 7:
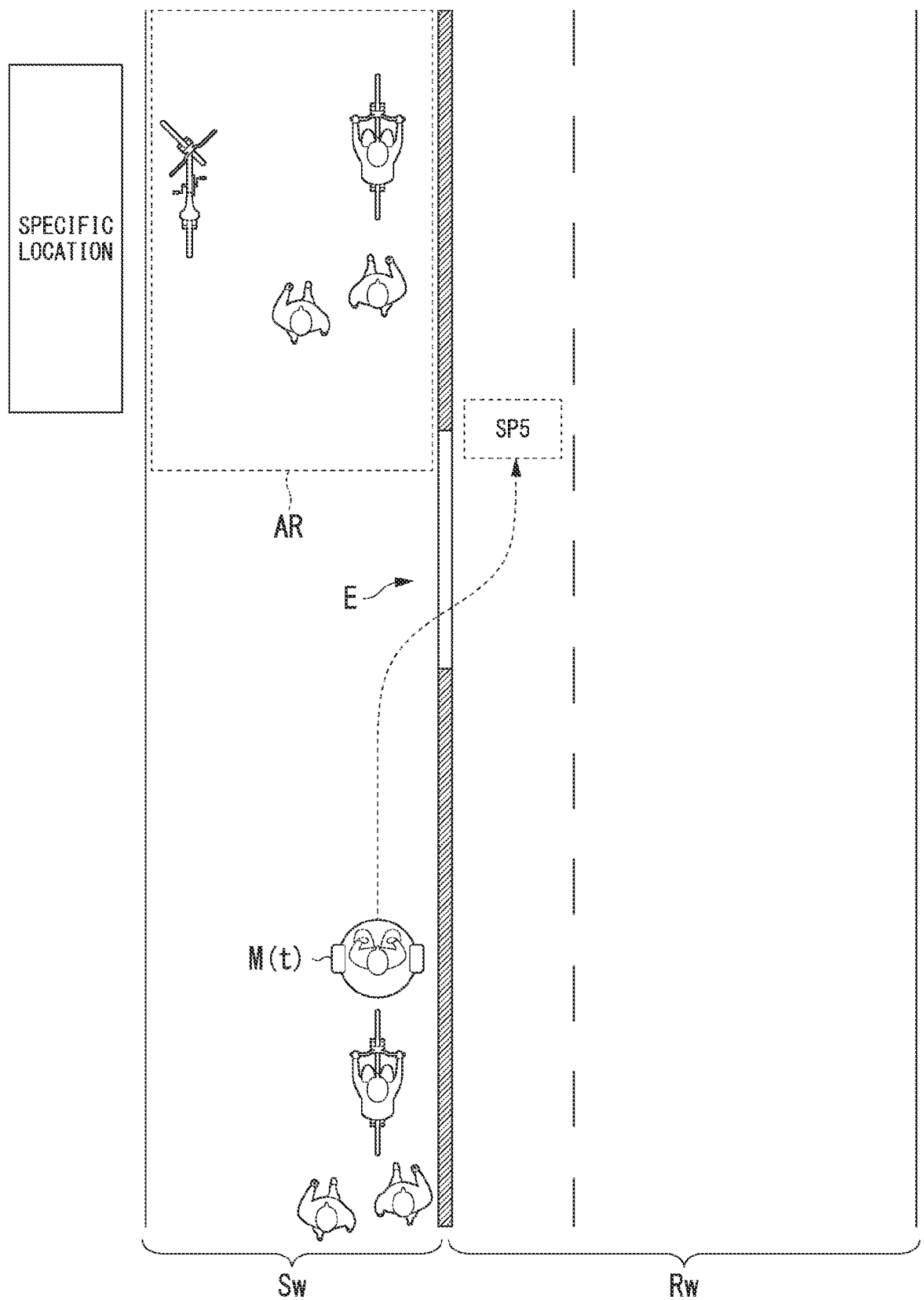
FIG. 7 is a diagram showing still another example of a stop position of the moving object in a case where the degree of congestion of the predetermined region is equal to or more than the threshold value.

FIG. 7 is a diagram showing still another example of a stop position of the moving object M in a case where the degree of congestion of the predetermined region AR is equal to or more than the threshold value. The description will focus on differences from FIG. 6. In a case where a rear object is present as shown in FIG. 7, the moving object M may determine a position SP5 as a stop position. The position SP5 is near the entrance E of the sidewalk on the roadway and is a position that does not obstruct other moving objects or the like from entering the sidewalk from the roadway via the entrance E of the sidewalk even if the moving object M stops.

For example, the moving object M determines the position SP5 as a stop position in a case where the number of rear objects or the density on the sidewalk is equal to or more than a threshold value and determines the position SP4 as a stop position in a case where the number of rear objects or the density on the sidewalk is less than the threshold value.

As described above, the moving object M can realize control in consideration of a peripheral situation and the convenience of a user by avoiding a congested region and considering a rear object. For example, the moving object M can contribute to smooth sidewalk traffic. As described above, the moving object M can determine a more appropriate position as a stop position.

Process When Determining Stop Position (Fifth)

Figure 8:
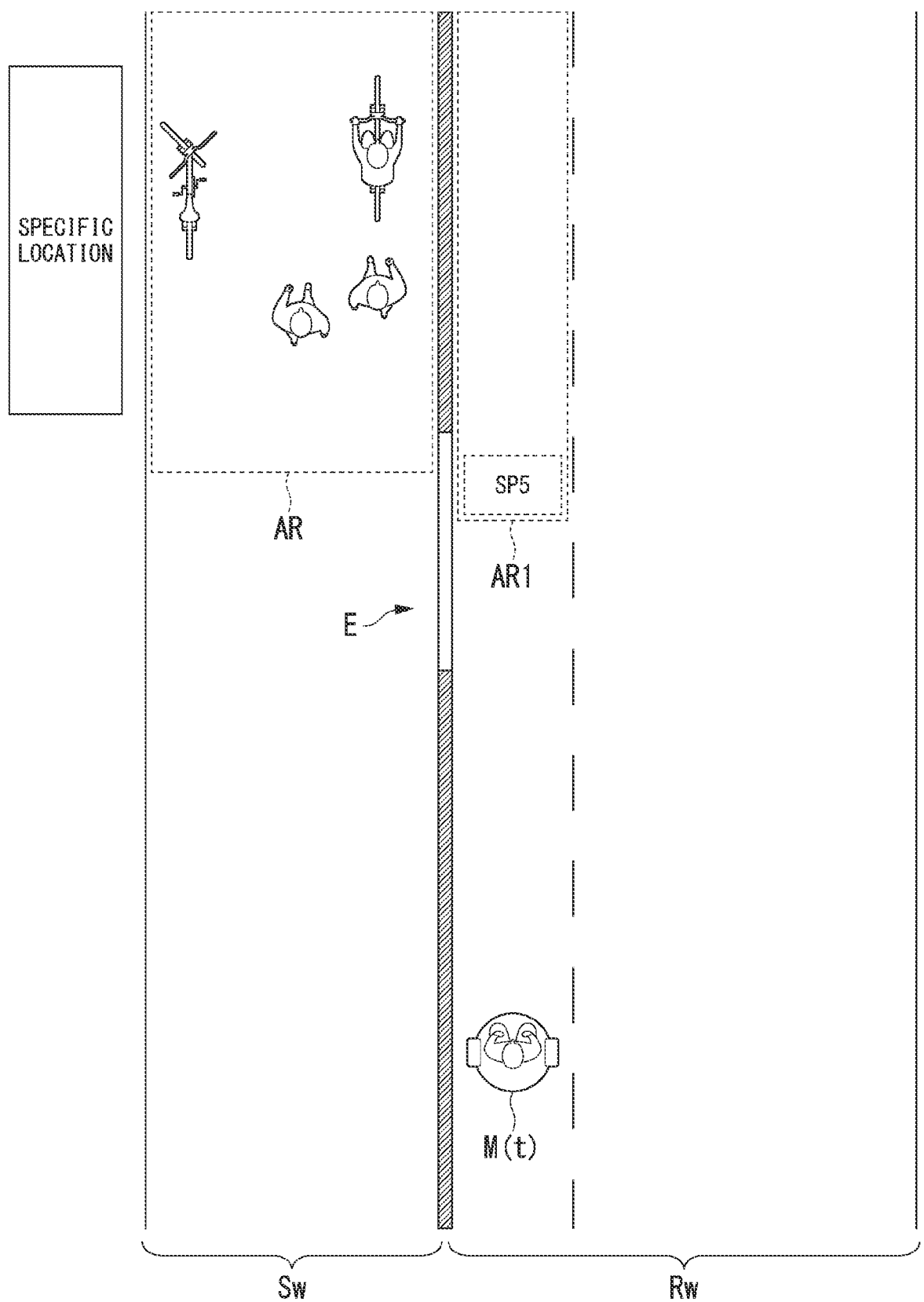
FIG. 8 is a diagram showing still another example of a stop position of the moving object in a case where the degree of congestion of the predetermined region is equal to or more than the threshold value.

FIG. 8 is a diagram showing an example of a stop position of the moving object M in a case where the degree of congestion of the predetermined region AR is equal to or more than the threshold value. The description will focus on differences from FIG. 5. As shown in FIG. 8, in a case where the moving object M is present on the roadway and the degree of congestion of the predetermined region AR is equal to or more than the threshold value, the moving object M determines the position SP5 as a stop position, generates a route toward the position SP5, travels along the route, and stops at the position SP5. However, in a case where the degree of congestion of the vicinity of the specific location on the roadway (for example, a predetermined region AR1) is equal to or more than the threshold value (for example, in a case where there is a stopped vehicle or the like), the moving object M stops at a position different from the vicinity of the specific location on the roadway. The predetermined region AR1 is, for example, a shoulder or a roadside zone outside a lane defined by a road lane marking on the roadway.

As described above, since the moving object M sets an appropriate position as a stop position according to the degree of congestion of the sidewalk or the roadway, it is possible to realize control in consideration of a peripheral situation and the convenience of a user. As described above, the moving object M can determine a more appropriate position as a stop position.

Instead of the position SP5, the moving object M may set a position in front of the predetermined region AR on the sidewalk (for example, the position SP4 in FIG. 6) as a stop position. In a case where a rear object is present behind the moving object M, a position in front of the predetermined region AR of the sidewalk that does not interfere with the rear object may be set as a stop position.

In the above example, a rear object has been described, but even in a case where there is a front object coming from the front of the moving object M toward the moving object M, such a position that does not obstruct movement of the front object is determined as a stop position in the same manner as in a case where there is a rear object.

In a case where there are rear objects (or front objects) on the sidewalk and the roadway, a position having a smaller interference score among interference scores for respective stop positions derived on the basis of a predetermined evaluation criterion may be determined as a stop position. For example, the interference score is an index indicating obstruction to movement of a rear object or a front object when the moving object M stops at that position. A position for which an interference score is small is a position that does not obstruct movement of a rear object or a front object compared with other positions.

Process When Determining Stop Position (Summary)

FIG. 9 is a diagram showing an example of a relationship between the degree of congestion of a predetermined region (sidewalk) of a sidewalk, the degree of congestion of a predetermined region (roadway) of a roadway, and the degree of congestion of an entrance of the sidewalk (an entrance of the sidewalk) on the roadway, and a preferential stop position. The predetermined region of the roadway is a region set with a specific location as a reference and is, for example, a region (for example, the predetermined region AR1 in FIG. 8) in which a user who gets off the moving object M can easily access the specific location, or a position where a user can easily access the moving object M when getting on the moving object M from the specific location.

(1) In a case where the degree of congestion of the sidewalk, the degree of congestion of the roadway, and the degree of congestion of the entrance of the sidewalk are less than the threshold value, the priority of the stop position is the sidewalk (the predetermined region of the sidewalk), the roadway (the predetermined region of the roadway), and the entrance of the sidewalk (the entrance of the sidewalk) on the roadway in this order.

(2) In a case where the degree of congestion of the sidewalk and the degree of congestion of the entrance of the sidewalk are less than the threshold value and the degree of congestion of the roadway is equal to or more than the threshold value, the priority of the stop position is the sidewalk and the entrance of the sidewalk in this order.

(3) In a case where the degree of congestion of the roadway and the degree of congestion of the entrance of the sidewalk are less than the threshold value and the degree of congestion of the sidewalk is equal to or more than the threshold value, the priority of the stop position is the entrance of the sidewalk and the roadway in this order.

(4) In a case where the degree of congestion of the roadway is less than the threshold value and the degree of congestion of the sidewalk and the degree of congestion of the entrance of the sidewalk are equal to or more than the threshold value, the stop position is the roadway.

(5) In a case where the degree of congestion of the entrance of the roadway is less than the threshold value and the degree of congestion of the sidewalk and the degree of congestion of the roadway are equal to or more than the threshold value, the stop position is the entrance of the sidewalk.

The above priority may be changed for each specific location, for example. For example, in the above (1), for a "specific location A", the priority is the sidewalk, the roadway, and the entrance of the sidewalk in this order as described above, but for a "specific location B", the priority may be the roadway, the entrance of the sidewalk, and the sidewalk in this order. In a case where the priority is set for each specific location as described above, a stop position is determined according to a peripheral situation or characteristics of a specific location. For example, regarding a sidewalk at a specific location, for example, in a case where the degree of congestion is chronically high or in a case where it is not preferable to cause the moving object M to stop on the sidewalk at the specific location, a stop position is determined according to the circumstances or the situation at the specific location. The above priority may be changed, for example, depending on whether a specific location is a waypoint or a destination.

Process When Determining Stop Position (Another First)

Even in a case where the conditions related to the degree of congestion are satisfied, if "predetermined conditions" are satisfied, it may be determined not to stop at a position where the conditions related to the degree of congestion are satisfied. FIG. 10 is a diagram showing an example of condition information in which a specific location and a condition that the moving object does not stop on a sidewalk are correlated with each other. The condition information is stored in, for example, the storage 180. For example, even if the degree of congestion of a sidewalk at a target specific location is less than a threshold value, in a case where conditions for not stopping on the sidewalk as shown in FIG. 10 (an example of "predetermined conditions") is satisfied, the moving object does not stop on the sidewalk, and a position in another region of which the degree of congestion is less than the threshold value (in another region which does not belong to the sidewalk region) is determined as a stop position.

The conditions for not stopping on the sidewalk are, for example, the day of the week, the date and time, the weather, and a user's attribute. For example, the conditions for not stopping on the sidewalk may be that the day of the week is Monday or a time period is a predetermined time period. The conditions for not stopping on the sidewalk may be that the weather is fine or a user is an adult. The conditions for not stopping on the sidewalk are details for each specific location according to characteristics of the specific location or peripheral situations of the specific location. In the example in FIG. 10, the conditions for not stopping on a sidewalk are correlated with a specific location, but conditions for not stopping on a roadway or conditions for not stopping at an entrance of a sidewalk may be correlated with a specific location.

The degree of congestion is an example of a dynamic element that "dynamically changes on a sidewalk", and the time, the time period, the weather, or the user's attribute is an example of a "static element that does not dynamically change on a sidewalk".

As described above, the control device 100 can determine a stop position according to the characteristics of the specific location and the peripheral situations by taking into consideration the conditions for not stopping on the sidewalk in addition to the degree of congestion. For example, in an environment where the moving object M should not stop on a sidewalk on a specific day of the week or a time period, the environment is taken into consideration, and the moving object M does not stop on the sidewalk but stops at another position. As described above, the moving object M can determine a more appropriate position as a stop position.

As shown in FIG. 11, the user's attribute may be correlated with the conditions for not stopping on the sidewalk. That is, the predetermined conditions may include whether or not an attribute of a moving object is a predetermined attribute. For example, as shown in FIG. 11, in addition to the day of the week, the time period, and the weather (conditions for not stopping on the sidewalk), the user's attribute to which the conditions for not stopping on the sidewalk are applied is correlated with each specific location. For example, even in a case where a user with other attributes (a user with an attribute other than a child or a person with a disability) does not stop on the sidewalk due to the conditions for not stopping on the sidewalk, if the user's attribute is a child or a person with a disability, the conditions for not stopping on the sidewalk are set such that the user stops on the sidewalk. The control device 100 determines whether or not to cause the moving object M to stop on the sidewalk near a specific location or at a location different from the sidewalk on the basis of whether or not a user's attribute satisfies the conditions for not stopping on the sidewalk in addition to the day of the week, the time period, or the weather even if the degree of congestion of the sidewalk near the specific location is less than the threshold value. Consequently, it is possible to determine a more appropriate position as a stop position.

The control device 100 may determine whether to cause the moving object M to stop on the sidewalk near the specific location or at a location different from the sidewalk on the basis of whether the specific location is a waypoint or a destination in addition to the degree of congestion. The conditions for not stopping on the sidewalk may be changed depending on whether the specific location is a waypoint or a destination. That is, the predetermined conditions may include whether the specific location is a waypoint or a destination. For example, correspondence information in which the specific location, the conditions for not stopping on the sidewalk, and the user's attribute shown in FIG. 11 are correlated with each other includes a pattern in a case where the specific location is a waypoint and a pattern in a case where the specific location is a destination. The control device 100 determines a stop position on the basis of the type of the specific location (a waypoint or a destination) and the correspondence information. Whether the specific location is a destination or a waypoint may be included in other factors. For example, in a case where the specific location is a waypoint, condition information may be generated such that the moving object M is less likely to stop on the sidewalk than in a case where the specific location is a destination. That is, in a case where the specific location is a waypoint, the conditions for not stopping on the sidewalk may be stricter than in a case where the specific location is a destination. In the above-described way, a movement speed at the time of movement after stopping at the waypoint can be increased more smoothly, and thus the movement can be made smooth. This is only an example, and contrary to the above, condition information may be generated such that, for example, in a case where the specific location is a waypoint, the moving object M is more likely to stop on the sidewalk than in a case where the specific location is a destination. That is, in a case where the specific location is a waypoint, the conditions for not stopping on the sidewalk may be relaxed compared with a case where the specific location is a destination. In the above-described way, it is possible to stop on a sidewalk and stop by a waypoint such as a restaurant by which a user stops for take-out or a sightseeing spot by which a user stops while riding the moving object M, and then quickly head for a destination.

As described above, the control device 100 can determine a stop position in consideration of an attribute of a user who uses the moving object M. For example, the conditions for not stopping on the sidewalk correlated with a specific user for whom it is preferable to reduce an amount of movement on foot are relaxed compared with conditions for other users. For example, the control device 100 determines the roadway as a stop position when another user gets off but may determine the sidewalk as a stop position when a specific user gets off. As described above, the moving object M can determine a more appropriate position as a stop position.

Process When Determining Stop Position (Another Second)

Figure 12:
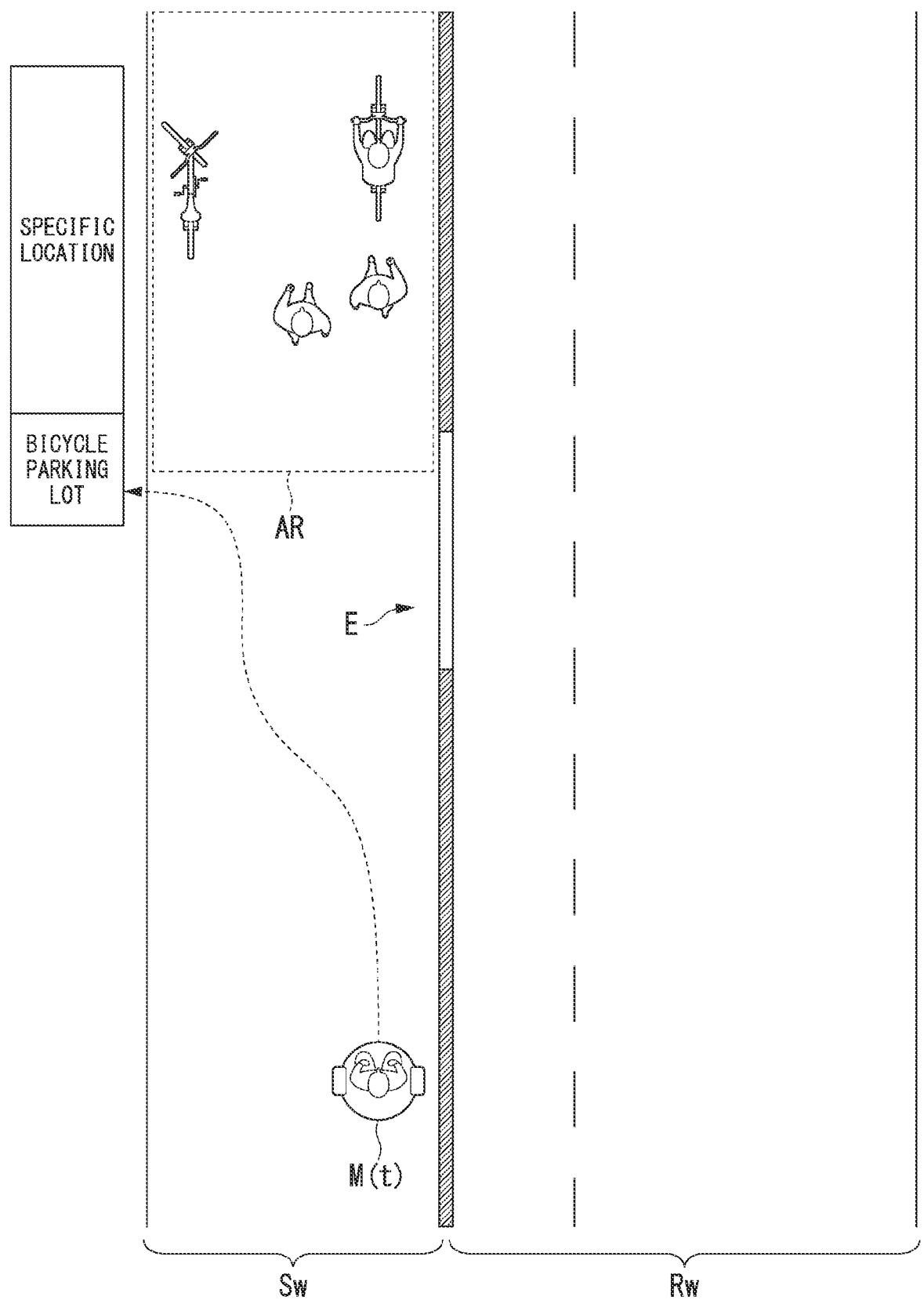
FIG. 12 is a diagram showing an example of a stop region.

In a case where there is a stop region managed by a specific location or affiliated with the specific location, the moving object M may determine the stop region as a stop position. FIG. 12 is a diagram showing an example of a stop region. The stop region is, for example, a bicycle parking lot provided at a specific location. The stop region may be a parking lot instead of (in addition to) the bicycle parking lot, or other regions where a user can get on and off the moving object M. For example, the moving object M makes the priority of stopping at the bicycle parking lot higher than the priority of stopping on the sidewalk, on the roadway, and at the entrance of the roadway. In a case where the degree of congestion of the bicycle parking lot is less than the threshold value, the moving object M determines the bicycle parking lot as a stop position. In a case where the degree of congestion of the bicycle parking lot is equal to or more than the threshold value, the moving object M determines a stop position according to the priority or the degree of congestion of other regions. The moving object M may determine the stop region as a stop position on the basis of a result of determination of whether a distance between the stop region managed by the specific location or affiliated with the specific location and the specific location is within a predetermined distance. For example, in a case where the distance is within the predetermined distance, the stop region is determined as a stop position, and in a case where the distance is not within the predetermined distance, a position different from the stop region is determined as a stop position.

In the above example, the priority of the bicycle parking lot has been described as the highest priority, but the priority of the bicycle parking lot may be changed for each specific location. For example, the priority of the bicycle parking lot at a predetermined specific location may be set lower than the priority of the sidewalk. The control device 100 acquires schedule information (time scheduled to stay at a specific location or contents of errands) registered by a user in a terminal device or schedule information registered in a social networking service and calculates a scheduled parking time on the basis of the acquired information. In a case where the calculated scheduled parking time is less than a predetermined threshold value, the control device 100 may set the priority of the bicycle parking lot at a predetermined specific location to be lower than the priority of the sidewalk, or in a case where the calculated scheduled parking time is more than the threshold value, may set the priority of the bicycle parking lot at the predetermined specific location to be higher than the priority of the sidewalk.

As described above, by determining a stop position in consideration of a stop region managed by a specific location or affiliated with the specific location, the moving object M can determine the stop position suitable for a facility possessed by the specific location and a peripheral situation of the specific location. As described above, the moving object M can determine a more appropriate position as a stop position.

Flowchart

Figure 13:
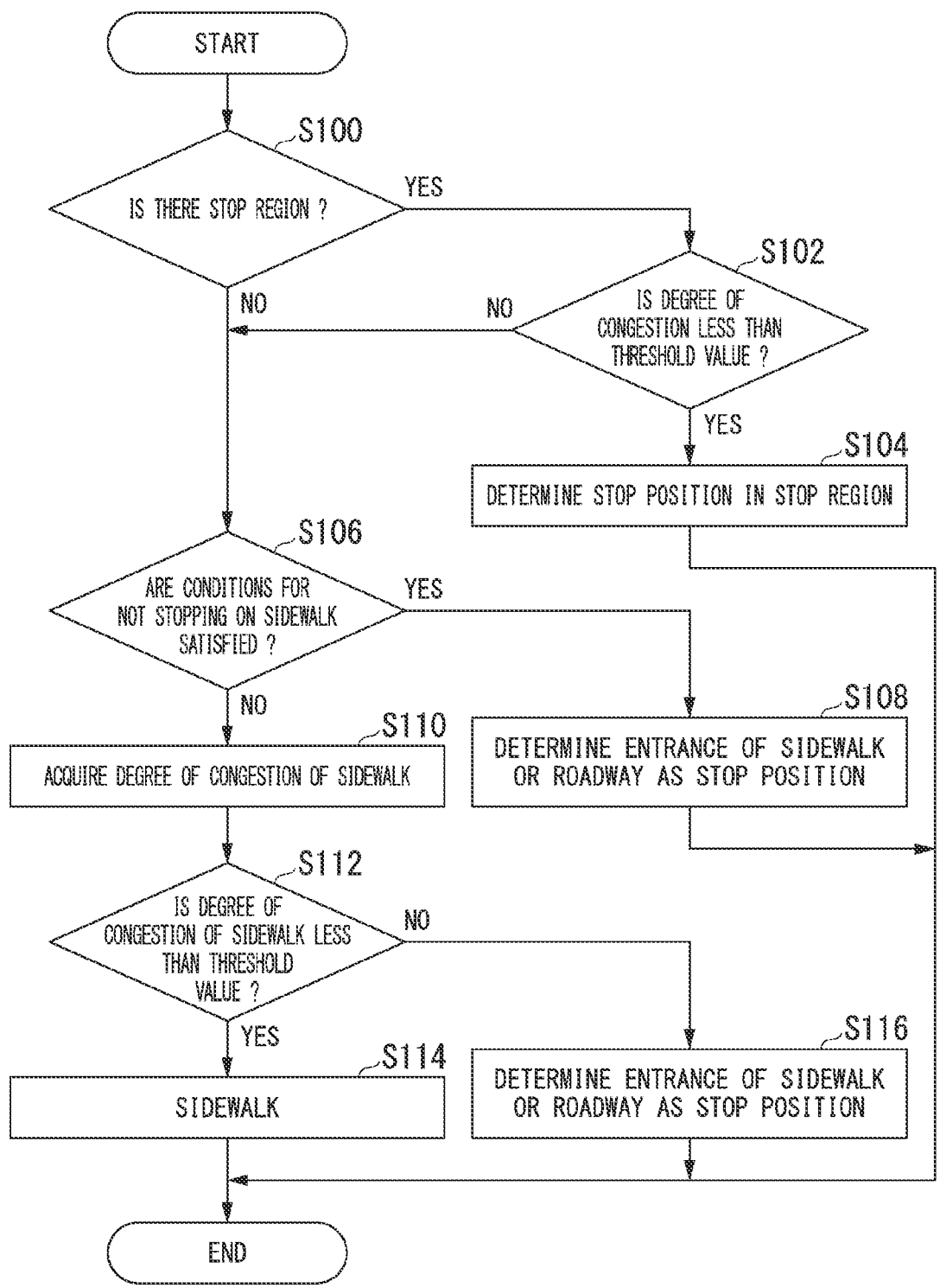
FIG. 13 is a flowchart showing an example of a flow of a process executed by the control device.

FIG. 13 is a flowchart showing an example of a flow of a process executed by the control device 100. The present process is executed, for example, in a case where the moving object M approaches a specific location. First, the control device 100 determines whether or not there is a stop region such as a bicycle parking lot (step S100). In a case where there is the stop region, the control device 100 determines whether or not the degree of congestion of the stop region is less than a threshold value (step S102). In a case where the degree of congestion of the stop region is less than the threshold value, the control device 100 determines the stop region as a stop position (step S104).

In a case where the degree of congestion of the stop region is not less than the threshold value (in a case where it is equal to or more than the threshold value) or in a case where there is no stop region, the control device 100 determines whether or not conditions for not stopping on a sidewalk correlated with the specific location are satisfied (step S106). In the present process, the "conditions for not stopping on the sidewalk" are the days of the week, the date and time, the weather, and the like where the sidewalk is not a stop position.

In a case where the conditions for not stopping on the sidewalk are satisfied, the control device 100 determines a stop position in consideration of the degree of congestion (step S108). For example, the control device 100 determines an entrance of the sidewalk or a roadway as a stop position. Consequently, the process in this flowchart is finished.

In a case where the conditions for not stopping on the sidewalk are not satisfied, the control device 100 acquires the degree of congestion of the sidewalk (step S110). Next, the control device 100 determines whether or not the degree of congestion of the sidewalk is less than the threshold value (step S112). In a case where the degree of congestion of the sidewalk is less than the threshold value, the control device 100 determines the sidewalk as a stop position (step S114).

In a case where the degree of congestion of the sidewalk is not less than the threshold value (in a case where it is equal to or more than the threshold value), the control device 100 determines a stop position in consideration of the degree of congestion (step S108). For example, the control device 100 determines the entrance of the sidewalk or the roadway as a stop position. Consequently, the process in this flowchart is finished. In the above process, a stop position may be determined in consideration of a front object or a rear object.

As described above, the control device 100 can determine a stop position suitable for a specific location or a situation near the specific location on the basis of the conditions for not stopping on the sidewalk set for each specific location and the degree of congestion of the sidewalk or the like.

According to the first embodiment described above, the control device 100 can appropriately determine a stop position of the moving object M according to the degree of congestion of the sidewalk near the specific location when a first user who has ridden the moving object M gets off at the specific location, or a second user who is scheduled to ride the moving object M gets on at the specific location.

Second Embodiment

Hereinafter, a second embodiment will be described focusing on differences from the first embodiment. In the second embodiment, the control device 100 determines whether or not a sidewalk is to be included in a route of the moving object M on the basis of a result of determination of whether or not, among a plurality of elements, an element selected on the basis of the priority based on the type of the specific location near the sidewalk satisfies a criterion defined for each element. In other words, the control device 100 determines whether or not a sidewalk is to be included in a movement route on which the moving object M moves on the basis of a result of determination of whether or not the plurality of elements satisfy the criterion for each element and the priority of the plurality of elements. The priority of the plurality of elements is set on the basis of the type of the specific location near the sidewalk.

The "plurality of elements" include a congestion status in a real-time in sidewalk near a specific location or a congestion status in a real-time in near the sidewalk near a specific location (for example, a sidewalk, a roadway, or an entrance of the sidewalk slightly away from the specific location) and other elements different from the congestion status. The other elements can be said to be, for example, absolutely defined absolute elements. The other elements include, for example, one or more elements of time, day of the week, and weather. The other elements include an attribute of a user who is riding the moving object M or an attribute of a user who is scheduled to ride the moving object M.

In a case where the specific location is a highly public facility, for example, the priority of the other elements is higher than the priority of the congestion status (the priority of the other elements is considered more than the priority of the degree of congestion). In a case where the specific location is not a highly public facility, for example, the priority of the congestion status is higher than the priority of the other elements. Highly public facilities are, for example, schools, cram schools, or train stations, and less public facilities are, for example, private houses. As for a criterion for the other elements, a criterion according to characteristics of a specific location is correlated with the specific location.

The control device 100 determines whether or not a sidewalk is to be included in a movement route on which the moving object M moves with reference to priority information shown in FIG. 14. The phrase "determines whether or not a sidewalk is to be included in a movement route on which the moving object M moves" means, for example, to determine whether the moving object M travels on the sidewalk near the specific location and moves toward the specific location (a destination or a waypoint), or to determine whether or not a stop position of the moving object M is the sidewalk when a user gets on or gets off at the specific location. The sidewalk near the specific location is a sidewalk in front of the specific location or a sidewalk within a predetermined range from the specific location (a sidewalk in a range of several meters to several hundred meters).

FIG. 14 is a diagram showing an example of details of the priority information. In FIG. 14, specific locations are, for example, a "cram school/school", a "station", and "home". A plurality of elements are "time", the "day of the week", "weather", the "degree of congestion of a sidewalk", and the "degree of congestion of a roadway". In the priority information, the priority is correlated with the element as shown in the upper part of FIG. 14. For example, in the "cram school/school", the "time" and the "day of the week" is correlated with the highest polarity, then the "degree of congestion of a sidewalk" is correlated with the second highest priority, and then the "weather" is correlated with the third highest priority in the priority information.

Among the above, the "time", the "day of the week", and the "weather" are other elements that do not change depending on traffic conditions, and the "degree of congestion of a sidewalk" and the "degree of congestion of a roadway" are changing elements that change depending on traffic conditions.

As shown in the lower part of FIG. 14, conditions are correlated with a combination of a specific location and an element. For example, the condition "Saturday or Sunday" is correlated with a combination of the "cram school/school" and the "day of the week". In this case, a condition for stopping on a sidewalk near the "cram school/school" is "Saturday or Sunday", and the condition is not satisfied from Monday to Friday, and the moving object M cannot stop on the sidewalk.

Similarly, a condition "other than 7:30 to 9:00 and other than 17:00 to 20:00" is correlated with a combination of the "station" and the "time". In this case, a condition for stopping on a sidewalk near the "station" is "other than 7:30 to 9:00 and other than 17:00 to 20:00", and "7:30 to 9:00" and "17:00 to 20:00" do not satisfy the condition and the moving object M cannot stop on the sidewalk.

As described above, the control device 100 determines whether or not, for example, among a plurality of elements, two or more elements (for example, the time and the day of the week) selected on the basis of the priority based on the type of the specific location near the sidewalk satisfy the criterion defined for each element. The control device 100 determines a stop position of the moving object M in a sidewalk region near the specific location in a case where the two or more elements satisfy the criterion defined for each element and determines a stop position in another region different from the sidewalk region in a case where the criterion is not satisfied. As described above, the control device 100 determines whether a stop position of the moving object M is in the sidewalk region near the specific location or in another region different from the sidewalk region on the basis of a result of determination of whether or not an element selected on the basis of the priority based on the type of the specific location near the sidewalk among the plurality of elements satisfies the criterion defined for each element. Consequently, the moving object M can more consider a peripheral situation.

As shown in FIG. 15, the other elements may include a user's attribute. For example, the other elements include the user's attribute and one or more elements of time, day of the week, and weather. For example, the priority of the user's attribute differs depending on the type of the specific location. For example, in a case where the specific location is a facility for users with specific attributes (for children) such as a "cram school/school", the priority of the user's attribute is higher than the priority of the other elements or the degree of congestion. In this case, for example, a condition that the moving object M can stop on the sidewalk is that the user's attribute is a "child". Also in a case where the specific location is a highly public facility such as a "station", the priority of the user's attribute may be set higher than the priority of the other elements or the degree of congestion. For example, a priority and a user's attribute are set such that there is a tendency for users with attributes such as "persons with disabilities/XX years old or older" who are generally considered to have a shorter travel distance to a specific location to move closer to a "station".

The priority information may be prepared for each user's attribute as shown in FIG. 16. For example, the priority information may be prepared for each child, adult, person XX years old or older, and a person with a disability. The priority information is set such that a child, a person XX years old or older, and a person with a disability can stop on the sidewalk even in a case where users with other attributes do not stop on the sidewalk. As described above, by setting a priority or a criterion for each of a plurality of elements on the basis of the user's attribute, it is determined whether to include a sidewalk in a movement route in consideration of the user's attribute and surroundings. In the information in which the priority is correlated with a plurality of elements as shown in FIGS. 14 to 16 described above, an element may include whether a specific location is a destination or a waypoint, or information in which a location, an element, and a priority are correlated with each other in a case where a specific location is a destination, and the point, the element and information in which a location, an element, and a priority are correlated with each other in a case where a specific location is a waypoint may be prepared.

The above priority may be changed, for example, depending on whether a specific location is a waypoint or a destination. For example, in a case where the specific location is a waypoint, the degree of congestion of the sidewalk may be more important than that of other elements in a case where the specific location is a destination. For example, in a case where the specific location is a waypoint, the degree of congestion of the sidewalk may be emphasized, and in a case where the specific location is a destination, other elements may be emphasized instead of (or in addition to) the degree of congestion of the sidewalk. For example, in a case where a restaurant by which a user stops for take-out or a sightseeing spot by which a user stops while riding the moving object M is set as a waypoint, if the sidewalk is not crowded, the user can move along the sidewalk, stop by the waypoint quickly, and head for a destination. Thus, in a case where the degree of congestion of the sidewalk is less than the threshold value, even if the sidewalk is used, the surroundings can be sufficiently considered and a user's convenience is improved. The above is an example, and conversely, in a case where the specific location is a destination, the degree of congestion of the sidewalk may be more important than in a case where the specific location is a waypoint. For example, in a case where the specific location is a destination, the degree of congestion of the sidewalk may be emphasized, and in a case where the specific location is a waypoint, other elements may be emphasized instead of (or in addition to) the degree of congestion of the sidewalk.

Flowchart

Figure 17:
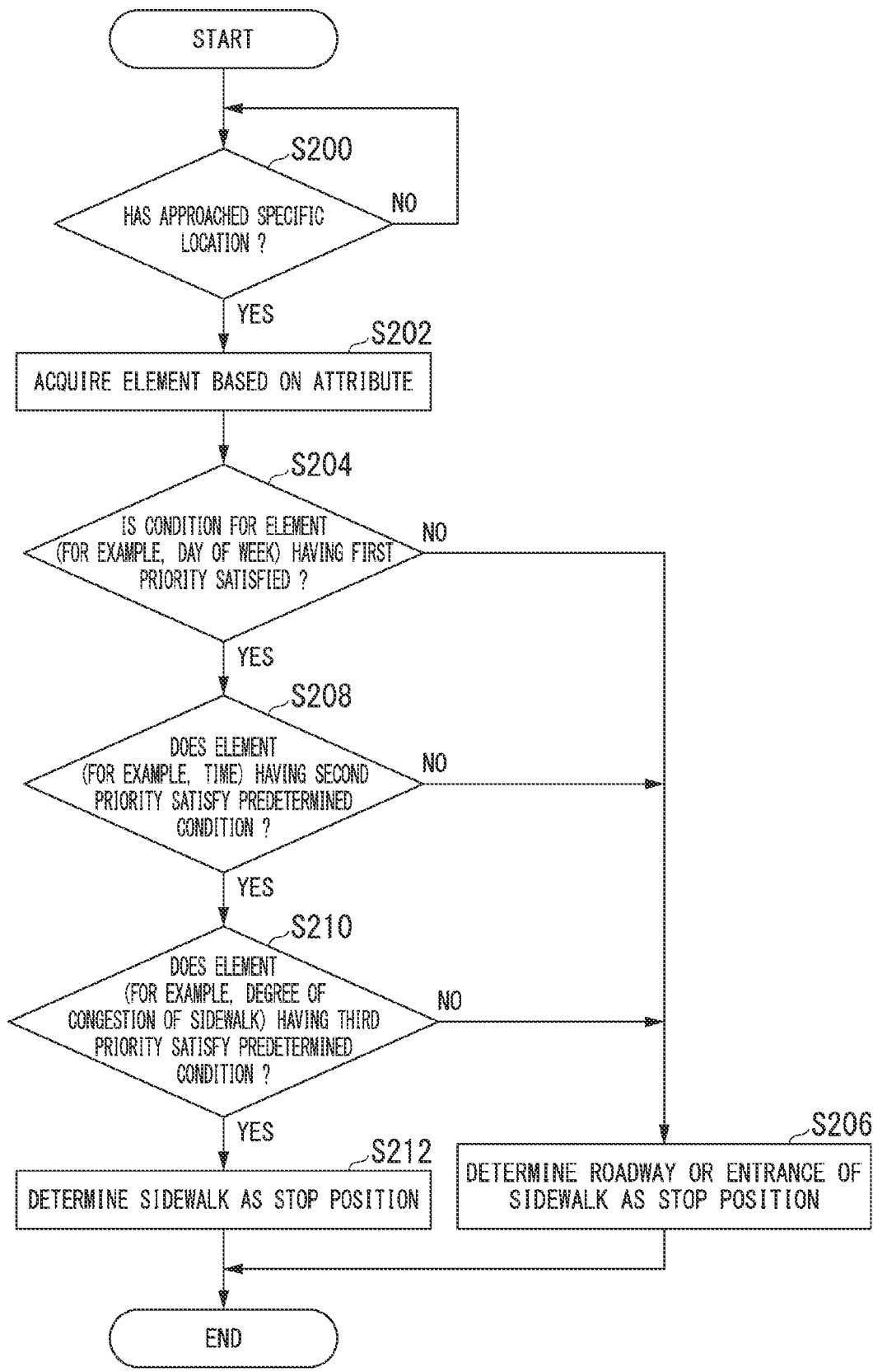
FIG. 17 is a flowchart showing an example of a flow of a process executed by a control device of a second embodiment.

FIG. 17 is a flowchart showing an example of a flow of a process executed by the control device 100 of the second embodiment. First, the control device 100 determines whether or not the moving object M has approached a specific location (step S200). In a case where the moving object M has approached the specific location, the control device 100 refers to the priority information and acquires an element based on the user's attribute and a priority (step S202). For example, in the following description, "day of the week", "time", and the "degree of congestion of the sidewalk" are elements, and the priority is given in this order.

Next, the control device 100 determines whether or not a condition correlated with the element (day of the week)

having a first priority (highest priority) is satisfied (step S204). In a case where the condition correlated with the element having the first priority is not satisfied, the control device 100 determines the roadway or the entrance of the sidewalk as a stop position (step S206). For example, a stop position is determined on the basis of the ideas shown in FIG. 9 and its description.

In a case where the condition correlated with the element having the first priority is satisfied, the control device 100 determines whether or not a condition correlated with the element (time) having a second priority (the next highest priority after the first priority) is satisfied (step S208). In a case where the condition correlated with the element having the second priority is not satisfied, the process proceeds to step S206.

In a case where the condition correlated with the element having the second priority is satisfied, the control device 100 determines whether or not a condition correlated with the element (the degree of congestion of the sidewalk) having a third priority (the next highest priority after the second priority) is satisfied (step S210). In a case where the condition correlated with the element having the third priority is not satisfied, the process proceeds to step S206.

In a case where the condition correlated with the element having the third priority is satisfied, the control device 100 determines the sidewalk as a stop position (step S212). Consequently, the process of one routine in this flowchart is finished. In a case where there is a stop region such as a bicycle parking lot at the specific location and the degree of congestion of the stop region is less than the threshold value, the control device 100 may determine the stop region as a stop position.

Figure 18:
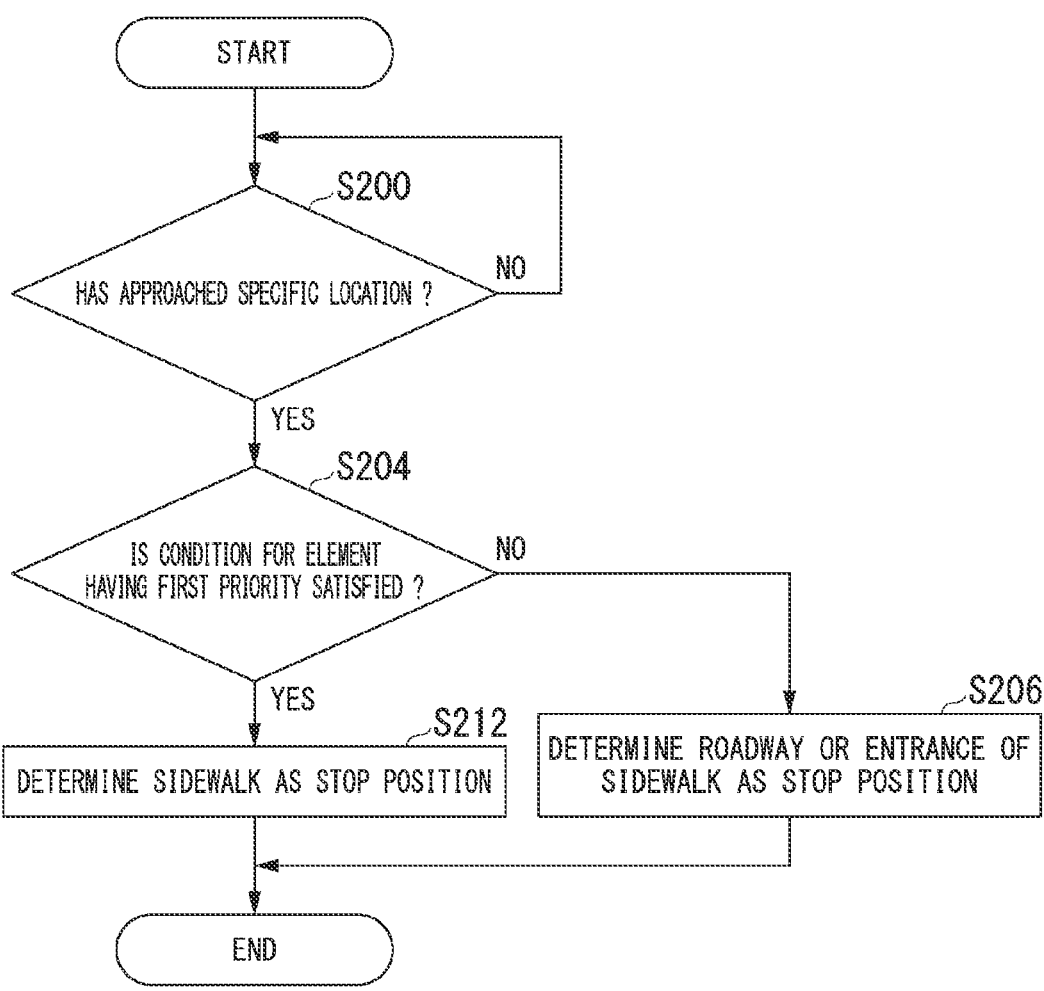
FIG. 18 is a flowchart showing another example of a flow of a process executed by the control device of the second embodiment.

Some processes may be omitted in the above process. FIG. 18 is a flowchart showing another example of a flow of a process executed by the control device 100 of the second embodiment. In the present process, an example in which the determination related to the second priority and the third priority and the process of acquiring the element based on the user's attribute in step S202 in FIG. 17 are omitted will be described.

First, the control device 100 determines whether or not the moving object M has approached the specific location (step S200). Next, the control device 100 determines whether or not the condition correlated with the element having the first priority is satisfied (step S204). In a case where the condition correlated with the element having the first priority is not satisfied, the control device 100 determines the roadway or the entrance of the sidewalk as a stop position (step S206). In a case where the condition correlated with the element having the first priority is satisfied, the control device 100 determines the sidewalk as a stop position. Consequently, the process of one routine in this flowchart is finished. For example, in a case where the element having the first priority is the user's attribute, the sidewalk is set as a stop position if the user's attribute satisfies a condition for the user's attribute correlated with the element. For example, in a case where the element having the first priority is the degree of congestion, the sidewalk is set as a stop position if the degree of congestion satisfies a condition for the degree of congestion correlated with the element.

Through the above-described process, the control device 100 can determine a position to which the moving object M moves or a stop position thereof by taking into consideration the priority of an element defined for each specific location. As a result, the control device 100 can cause the moving object to travel with better consideration of peripheral situations.

For example, even in a case where the front of a specific location is not crowded, if the specific location is a highly public facility, it will soon become crowded, or stopping or traveling on a sidewalk in front of the specific location may be undesirable. As described above, in a real-time situation, even if the sidewalk can be used, the moving object M can accurately determine whether or not it is appropriate to use the sidewalk by taking into consideration the type of the specific location. As a result, it is possible to cause the moving object to travel in more consideration of peripheral situations.

According to the second embodiment described above, the control device 100 determines whether or not the sidewalk is to be included in a movement route on which the moving object M moves on the basis of a result of determination of whether or not a plurality of elements satisfy a criterion for each element and a priority based on a specific location near the sidewalk of the plurality of elements, and can thus cause the moving object M to travel with better consideration of peripheral situations.

The embodiments described above may be expressed as follows.

A moving object control system including:
a storage device configured to store a program; and
a hardware processor,
in which the hardware processor executes the program stored in the storage device to
recognize a peripheral situation of a moving object,
determine a stop position of the moving object corresponding to a specific location,
in a case where a degree of congestion of a sidewalk near the specific location is less than a threshold value, determine the stop position in a sidewalk region near the specific location, and
in a case where the degree of congestion of the sidewalk near the specific location is equal to or more than the threshold value, determine the stop position in another region that does not belong to the sidewalk region near the specific location.

The embodiments described above may be expressed as follows.

A moving object control system including:
a storage device configured to store a program; and
a hardware processor,
in which the hardware processor executes the program stored in the storage device to
determine whether or not a sidewalk is to be included in a route of a moving object on the basis of a result of determination of whether or not, among a plurality of elements, an element selected on the basis of a priority based on the type of a specific location near the sidewalk satisfies a criterion defined for each element.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:
1. A moving object control system comprising:
a storage device configured to store instructions; and
one or more processors configured to execute the instructions to:

determine a stop position for getting on a moving object or getting off of the moving object in a sidewalk region near a specific location based on a degree of congestion of a sidewalk near the specific location, the specific location being designated by a user, in a case where the moving object is moving, on the sidewalk, to the specific location; and control the moving object based on the determined stop position, and cause the moving object to travel along a longitudinal direction of the sidewalk on the sidewalk, in a case where the degree of congestion of the sidewalk region near the specific location is less than a threshold value, cause the moving object to stop in a first position, wherein the first position is on the sidewalk near the specific location, and in a case where the degree of congestion of the sidewalk region near the specific location is equal to or more than the threshold value, cause the moving object to stop in a second position, wherein the second position is on the sidewalk in the longitudinal direction and in front of the first position.

2. The moving object control system according to claim 1, wherein the degree of congestion is a degree to which objects are present on the sidewalk.

3. The moving object control system according to claim 1, wherein the region that does not belong to the sidewalk region includes a roadway near the specific location or a sidewalk region other than the sidewalk region near the specific location.

4. The moving object control system according to claim 1, wherein the one or more processors further executes the instructions to:

even if the degree of congestion of the sidewalk near the specific location is less than the threshold value, in a case where an element different from the degree of congestion satisfies a predetermined condition, determine the stop position in the region that does not belong to the sidewalk region.

5. The moving object control system according to claim 4, wherein, the element different from the degree of congestion is a static element that does not change dynamically in the vicinity of the sidewalk, unlike the degree of congestion that changes dynamically in the vicinity of the sidewalk.

6. The moving object control system according to claim 5, wherein the static element includes one or more elements of a day of a week, a time period, or a weather condition.

7. The moving object control system according to claim 5, wherein details of the static element are correlated with the specific location according to characteristics of the specific location.

8. The moving object control system according to claim 4, wherein the predetermined condition includes whether or not an attribute of a user of the moving object is a predetermined attribute.

9. The moving object control system according to claim 4, wherein the predetermined condition includes whether the specific location is a waypoint or a destination.

10. The moving object control system according to claim 1, wherein the one or more processors further executes the instructions to:

even if the degree of congestion of the sidewalk near the specific location is less than the threshold value, in a case where there is a region where the moving object can stop managed by the specific location or a region where the moving object can stop affiliated with the specific location, determine the stop position in the region where the moving object can stop.

11. The moving object control system according to claim 1, wherein the one or more processors further executes the instructions to:

in a case where the stop position of the moving object is determined in the sidewalk region near the specific location, determine a position that does not interfere with an object moving on the sidewalk as a stop position.

12. A moving object equipped with the moving object control system according to claim 1.

13. The moving object according to claim 12, wherein the moving object controls the own device such that the own device stops at the stop position determined by the one or more processor.

14. The moving object control system according to claim 1, wherein the one or more processors further execute the instructions to:

determine the stop position based on a degree of congestion of the sidewalk and a degree of congestion of a roadway near the specific location.

15. The moving object control system according to claim 1, wherein the one or more processors further execute the instructions to:

determine the stop position based on a degree of congestion of the sidewalk, a degree of congestion of a roadway near the specific location, and a degree of congestion of an entrance of the sidewalk between the roadway and the sidewalk.

16. The moving object control system according to claim 1, wherein the one or more processors further execute the instructions to: determine whether or not the sidewalk is to be included in a route of the moving object based on priority information, the priority information being information in which a type of the specific location is correlated with priorities.

17. The moving object control system according to claim 1, wherein the one or more processors further execute the instructions to:

in a case where the degree of congestion is equal to or more than the threshold value and there is a rear object traveling straight on the sidewalk along the longitudinal of the sidewalk behind the moving object, cause the moving object to stop at a third stop position that does not obstruct a traveling path of the rear object.

18. The moving object control system according to claim 17, wherein the stop position is further determined based on a correlation of a group of priority values representing the degree of congestion of the sidewalk near the specific location, a degree of congestion of a roadway near the specific location, a time period, a day of a week, and a weather condition near the specific location.

19. A control method, comprising, by a computer:

determining a stop position for getting on a moving object or getting off of the moving object in a sidewalk region near a specific location based on a degree of congestion of a sidewalk near the specific location, the specific location being designated by a user, in a case where the moving object is moving, on the sidewalk, to the specific location; and controlling the moving object based on the determined stop position, and causing the moving object to travel along a longitudinal direction of the sidewalk on the sidewalk, in a case where the degree of congestion of the sidewalk region near the specific location is less than a threshold value, causing the moving object to stop in a first position, wherein the first position is on the sidewalk near the specific location, and in a case where the degree of congestion of the sidewalk region near the specific location is equal to or more than the threshold value, cause the moving object to stop in a second position, wherein the second position is on the sidewalk in the longitudinal direction and in front of the first position.

20. A non-transitory computer storage medium storing a program causing a computer to execute:

determining a stop position for getting on a moving object or getting off of the moving object in a sidewalk region near a specific location based on a degree of congestion of a sidewalk near the specific location, the specific location being designated by a user, in a case where the moving object is moving, on the sidewalk, to the specific location; and controlling the moving object based on the determined stop position, and causing the moving object to travel along a longitudinal direction of the sidewalk on the sidewalk, in a case where the degree of congestion of the sidewalk region near the specific location is less than a threshold value, causing the moving object to stop in a first position, wherein the first position is on the sidewalk near the specific location, and in a case where the degree of congestion of the sidewalk region near the specific location is equal to or more than the threshold value, cause the moving object to stop in a second position, wherein the second position is on the sidewalk in the longitudinal direction and in front of the first position.

* * * * *